US012526677B2

(12) United States Patent
Ryu et al.

(10) Patent No.: US 12,526,677 B2
(45) Date of Patent: Jan. 13, 2026

(54) CHANNEL STATE INFORMATION (CSI) REPORTING TECHNIQUES FOR SECONDARY CELL (SCELL) ACTIVATION

(71) Applicant: QUALCOMM Incorporated, San Diego, CA (US)

(72) Inventors: Jae Ho Ryu, San Diego, CA (US); Kazuki Takeda, Tokyo (JP); Changhwan Park, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 630 days.

(21) Appl. No.: 18/049,493

(22) Filed: Oct. 25, 2022

(65) Prior Publication Data
US 2024/0137794 A1 Apr. 25, 2024
US 2024/0236737 A9 Jul. 11, 2024

(51) Int. Cl.
*H04W 24/10* (2009.01)
*H04L 5/00* (2006.01)
*H04W 24/08* (2009.01)

(52) U.S. Cl.
CPC ........... *H04W 24/10* (2013.01); *H04L 5/0051* (2013.01); *H04W 24/08* (2013.01)

(58) Field of Classification Search
CPC .... H04W 24/10; H04W 24/08; H04L 5/0051; H04L 5/0098; H04L 5/0057
See application file for complete search history.

(56) References Cited

U.S. PATENT DOCUMENTS

| 2020/0351841 | A1 | 11/2020 | Cirik et al. | |
|---|---|---|---|---|
| 2021/0028843 | A1* | 1/2021 | Zhou | H04B 7/063 |
| 2022/0038935 | A1* | 2/2022 | Xiong | H04L 1/0026 |
| 2023/0155760 | A1* | 5/2023 | Sun | H04L 5/0035 |
| | | | | 370/329 |

OTHER PUBLICATIONS

International Search Report and Written Opinion—PCT/US2023/074282—ISA/EPO—Dec. 9, 2023 (2205326WO).

* cited by examiner

*Primary Examiner* — Ayanah S George
(74) *Attorney, Agent, or Firm* — Holland & Hart LLP/Qualcomm

(57) ABSTRACT

This disclosure provides systems, methods and apparatuses that support channel state information (CSI) reporting techniques for secondary cell (SCell) activation. A user equipment (UE) may receive one or more medium access control-control elements (MAC-CEs) that indicate a secondary cell (SCell) activation command, an aperiodic tracking reference signal (AP-TRS) trigger, and an aperiodic channel state information (AP-CSI) report trigger. The network entity may signal the SCell activation command, the AP-TRS trigger, and the AP-CSI report trigger in the same MAC-CE or in separate MAC-CEs. The UE may receive and measure AP-TRS in accordance with the AP-TRS trigger indicated by the one or more MAC-CEs, and may perform measurements via an aperiodic channel measurement resource (AP-CMR) and an aperiodic interference measurement resource (AP-IMR) in accordance with the AP-CSI report trigger indicated by the one or more MAC-CEs. Accordingly, the UE may transmit an AP-CSI report associated with the measurements.

32 Claims, 8 Drawing Sheets

CHANNEL STATE INFORMATION (CSI) REPORTING TECHNIQUES FOR SECONDARY CELL (SCELL) ACTIVATION

TECHNICAL FIELD

This disclosure relates generally to wireless communication, and more specifically, to channel state information (CSI) reporting techniques for secondary cell (SCell) activation.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication at a user equipment (UE). The method may include receiving, via a first set of resources associated with a first cell, at least one medium access control (MAC)-control element (CE) that activates a second cell and triggers aperiodic channel state information (CSI) reporting for the second cell. The method may further include receiving, in accordance with the at least one MAC-CE, one or more aperiodic reference signals via a second set of resources associated with the second cell. The method may further include transmitting an aperiodic CSI report associated with a measurement of the one or more aperiodic reference signals.

Another innovative aspect of the subject matter described in this disclosure can be implemented in an apparatus for wireless communication at a UE. The apparatus may include one or more interfaces and a processing system. The apparatus may include one or more interfaces configured to obtain, via a first set of resources associated with a first cell, at least one MAC-CE that activates a second cell and triggers aperiodic CSI reporting for the second cell. The one or more interfaces may be further configured to obtain, in accordance with the at least one MAC-CE, one or more aperiodic reference signals via a second set of resources associated with the second cell. The one or more interfaces may be further configured to output an aperiodic CSI report associated with a measurement of the one or more aperiodic reference signals. In some implementations, the processing system may be configured to and capable of implementing the described operations of the apparatus.

Another innovative aspect of the subject matter described in this disclosure can be implemented in an apparatus for wireless communication at a UE. The apparatus may include means for receiving, via a first set of resources associated with a first cell, at least one MAC-CE that activates a second cell and triggers aperiodic CSI reporting for the second cell. The apparatus may further include means for receiving, in accordance with the at least one MAC-CE, one or more aperiodic reference signals via a second set of resources associated with the second cell. The apparatus may further include means for transmitting an aperiodic CSI report associated with a measurement of the one or more aperiodic reference signals.

Another innovative aspect of the subject matter described in this disclosure can be implemented in a non-transitory computer-readable medium storing code for wireless communication at a UE. The code may include instructions executable by a processor to receive, via a first set of resources associated with a first cell, at least one MAC-CE that activates a second cell and triggers aperiodic CSI reporting for the second cell. The code may further include instructions executable by the processor to receive, in accordance with the at least one MAC-CE, one or more aperiodic reference signals via a second set of resources associated with the second cell. The code may further include instructions executable by the processor to transmit an aperiodic CSI report associated with a measurement of the one or more aperiodic reference signals.

Some implementations of the methods, apparatuses, and non-transitory computer-readable media described herein may include operations, features, means, or instructions for receiving, via the at least one MAC-CE in accordance with the at least one MAC-CE activating the second cell, a first indication to trigger aperiodic tracking reference signal (TRS) measurements for the second cell and a second indication to trigger the aperiodic CSI reporting for the second cell, where the at least one MAC-CE is a single MAC-CE, and where receiving the one or more aperiodic reference signals via the second set of resources is in accordance with the second indication.

Some implementations of the methods, apparatuses, and non-transitory computer-readable media described herein may include operations, features, means, or instructions for receiving a first MAC-CE that activates the second cell and triggers aperiodic TRS measurements for the second cell, and operations, features, means, or instructions for receiving a second MAC-CE that triggers the aperiodic CSI reporting for the second cell, where receiving the one or more aperiodic reference signals is in accordance with the second MAC-CE.

Another innovative aspect of the subject matter described in this disclosure can be implemented in a method for wireless communication at a network entity. The method may include transmitting, via a first set of resources associated with a first cell, at least one MAC-CE that activates a second cell and triggers aperiodic CSI reporting for the second cell. The method may further include transmitting, in accordance with the at least one MAC-CE, one or more aperiodic reference signals via a second set of resources associated with the second cell. The method may further include receiving an aperiodic CSI report associated with a measurement of the one or more aperiodic reference signals.

Another innovative aspect of the subject matter described in this disclosure can be implemented in an apparatus for wireless communication at a network entity. The apparatus may include one or more interfaces and a processing system. The apparatus may include one or more interfaces configured to output, via a first set of resources associated with a first cell, at least one MAC-CE that activates a second cell and triggers aperiodic CSI reporting for the second cell. The one or more interfaces may be further configured to output, in accordance with the at least one MAC-CE, one or more aperiodic reference signals via a second set of resources associated with the second cell. The one or more interfaces may be further configured to obtain an aperiodic CSI report associated with a measurement of the one or more aperiodic reference signals. In some implementations, the processing system may be configured to and capable of implementing the described operations of the apparatus.

Another innovative aspect of the subject matter described in this disclosure can be implemented in an apparatus for wireless communication at a network entity. The apparatus may include means for transmitting, via a first set of resources associated with a first cell, at least one MAC-CE that activates a second cell and triggers aperiodic CSI reporting for the second cell. The apparatus may further include means for transmitting, in accordance with the at least one MAC-CE, one or more aperiodic reference signals via a second set of resources associated with the second cell. The apparatus may further include means for receiving an aperiodic CSI report associated with a measurement of the one or more aperiodic reference signals.

Another innovative aspect of the subject matter described in this disclosure can be implemented in a non-transitory computer-readable medium storing code for wireless communication at a network entity. The code may include instructions executable by a processor to transmit, via a first set of resources associated with a first cell, at least one MAC-CE that activates a second cell and triggers aperiodic CSI reporting for the second cell. The code may further include instructions executable by the processor to transmit, in accordance with the at least one MAC-CE, one or more aperiodic reference signals via a second set of resources associated with the second cell. The code may further include instructions executable by the processor to receive an aperiodic CSI report associated with a measurement of the one or more aperiodic reference signals.

Some implementations of the methods, apparatuses, and non-transitory computer-readable media described herein may further include operations, features, means, or instructions for transmitting an indication of multiple aperiodic channel measurement resources (CMRs) and multiple aperiodic interference measurement resources (IMRs) associated with the second cell via control signaling, where the set of multiple aperiodic CMRs and the set of multiple aperiodic IMRs include the second set of resources.

Some implementations of the methods, apparatuses, and non-transitory computer-readable media described herein may further include operations, features, means, or instructions for transmitting at least one aperiodic TRS via a third set of resources associated with the second cell, where the at least one MAC-CE further triggers the at least one aperiodic TRS, and where the at least one MAC-CE that triggers the aperiodic CSI reporting indicates a time offset between the third set of resources and the second set of resources.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
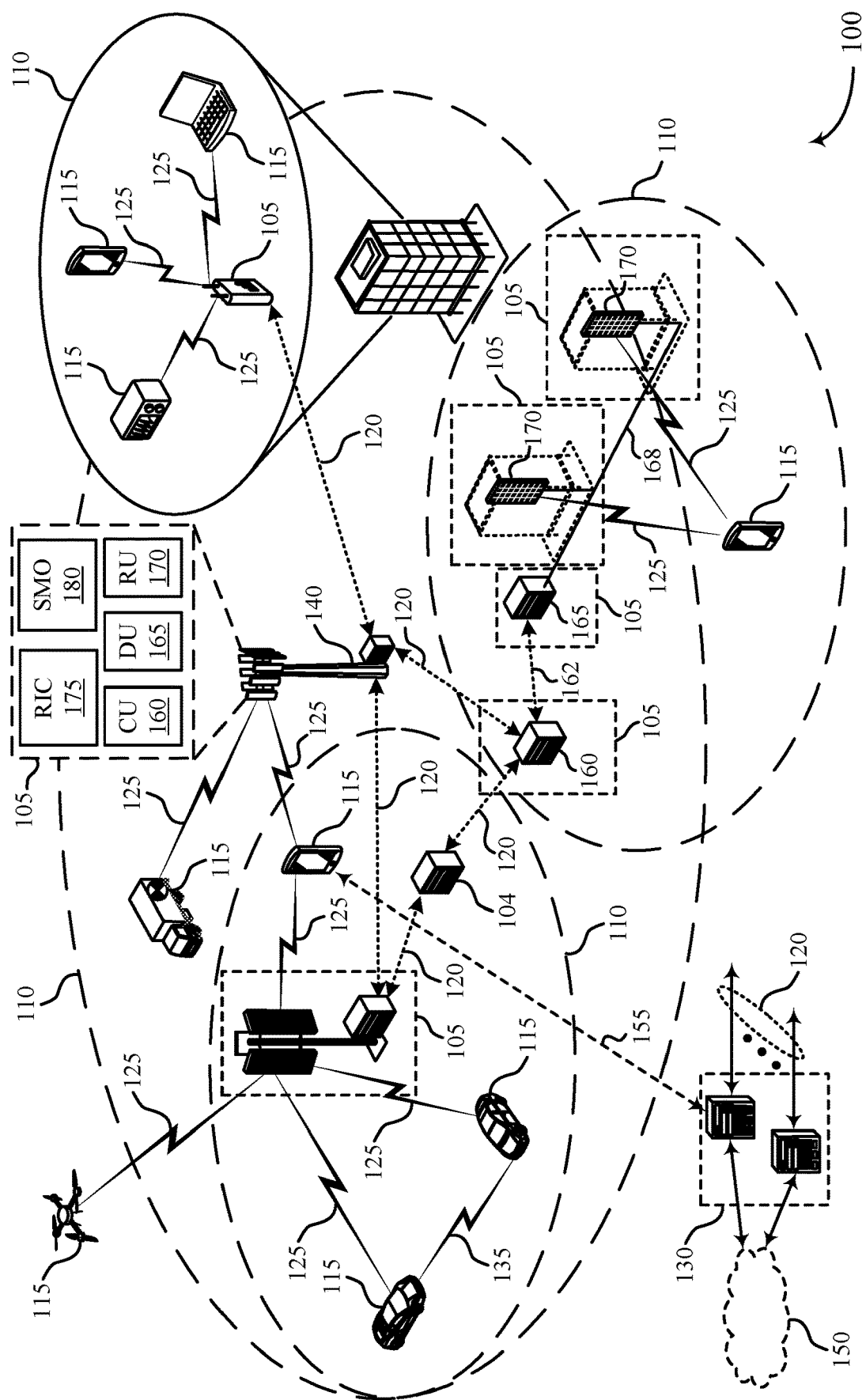
FIG. 1 shows an example wireless communications system that supports channel state information (CSI) reporting techniques for secondary cell (SCell) activation.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing third generation (3G), fourth generation (4G), fifth generation (5G), or sixth generation (6G), or further implementations thereof, technology.

In some wireless communications systems that support carrier aggregation, a network entity may communicate with a user equipment (UE) using multiple aggregated carrier frequencies, which may be referred to as cells or component carriers (CCs). One of the cells may be designated as a primary cell (PCell), while other cells may be designated as secondary cells (SCells). Using SCells may enable the network entity and the UE to communicate over a larger effective bandwidth in comparison to single carrier communication schemes, which may result in higher attainable throughput and greater spectral diversity. The network entity may activate an SCell for the UE by transmitting a medium access control (MAC)-control element (CE) that indicates an SCell activation command. In some scenarios, the MAC-CE also may trigger one or more aperiodic tracking reference signals (AP-TRSs), which the UE may use for one or more of automatic gain control (AGC), frequency tracking loop (FTL), and time tracking loop (TTL) operations at the UE (to accelerate downlink loop initialization for the SCell).

Once the SCell has been activated for the UE, the network entity may use the SCell to communicate with the UE. In some scenarios, however, the network entity may be unable to schedule downlink communications on the SCell until the network entity receives a channel state information (CSI) report from the UE. To generate the CSI report, the UE may receive and measure one or more CSI reference signals (CSI-RSs), synchronization signal blocks (SSBs), or other reference signals via a set of one or more channel measurement resources (CMRs) and one or more interference measurement resources (IMRs). If, for example, there is a delay between reception of the SCell activation command and the next available set of CMRs and IMRs, the UE may be unable to complete the SCell activation process and use the SCell to receive downlink communications from the network entity for a duration of the delay.

Various aspects of this disclosure support techniques for reducing the latency of SCell activation procedures by enabling the network entity to jointly transmit an aperiodic CSI (AP-CSI) reporting trigger with an SCell activation command. In some implementations, the network entity may transmit a single MAC-CE that includes an AP-CSI reporting trigger, an SCell activation command, and an AP-TRS trigger for the UE. In some other implementations, the network entity may include the AP-CSI reporting trigger in a separate MAC-CE. The AP-CSI reporting trigger may indicate at least one aperiodic CMR/IMR (AP-CMR/IMR) pair to use for CSI measurements associated with the SCell. In some implementations, the AP-CSI reporting trigger may indicate the at least one AP-CMR/IMR pair with respect to a set of AP-TRS resources indicated by the AP-TRS trigger. For example, the AP-CMR/IMR pair may be identified using a slot offset from an AP-TRS resource.

In some implementations, the AP-CSI reporting trigger also may indicate physical uplink shared channel (PUSCH) resources for the UE to use for a transmission of an AP-CSI report. Thus, in accordance with receiving the SCell activation command, the AP-TRS trigger, and the AP-CSI reporting trigger (such as in the same MAC-CE or in separate MAC-CEs), the UE may receive and measure one or more AP-TRSs, receive and measure one or more CSI-RSs via at least one AP-CMR/IMR pair, generate an AP-CSI report associated with the at least one AP-CMR/IMR pair, and transmit the AP-CSI report to the network entity using PUSCH resources indicated by the AP-CSI reporting trigger. In some implementations, the network entity may configure a time offset (such as a quantity of slots) between the one or more AP-TRSs and the at least one AP-CMR/IMR pair according to a downlink synchronization capability of the UE or a downlink resource availability of the network entity, or both.

Particular implementations of the subject matter described in this disclosure can be implemented to realize one or more of the following potential advantages. For example, the techniques and signaling mechanisms described herein may reduce the latency of SCell activation by enabling a network entity to jointly activate an SCell and trigger AP-CSI reporting for a UE. More specifically, the network entity may transmit at least one MAC-CE that indicates an activation command for the SCell and at least one AP-CMR/IMR pair for the UE to use for AP-CSI measurements associated with the SCell, which may enable the UE to generate and report CSI to the network entity with decreased latency. As a result, the UE may activate the SCell in a relatively shorter time span, thereby enabling the UE and the network entity to attain higher throughput levels by using the activated SCell for subsequent communications. In accordance with such lower latency and higher throughput levels, the UE and the network entity may experience greater multi-connectivity, higher data rates, greater spectral efficiency, and greater system capacity, among other benefits.

FIG. 1 shows an example wireless communications system 100 that supports CSI reporting techniques for SCell activation. The wireless communications system 100 may include one or more network entities 105, one or more UEs 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as a radio frequency (RF) access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, stand-alone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof.

An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending on which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)).

The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack.

The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions.

A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor.

One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)).

In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support CSI reporting techniques for SCell activation as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BS s, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation.

A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, subentity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

In some implementations, such as in a carrier aggregation configuration, a carrier also may have acquisition signaling or control signaling that coordinates operations for other carriers. A carrier may be associated with a frequency channel (such as an evolved universal mobile telecommunication system terrestrial radio access (E-UTRA) absolute RF channel number (EARFCN)) and may be identified according to a channel raster for discovery by the UEs 115. A carrier may be operated in a standalone mode, for which initial acquisition and connection may be conducted by the UEs 115 via the carrier, or the carrier may be operated in a non-standalone mode, for which a connection is anchored using a different carrier (such as of the same or a different radio access technology).

The communication links 125 shown in the wireless communications system 100 may include downlink transmissions (such as forward link transmissions) from a network entity 105 to a UE 115, uplink transmissions (such as return link transmissions) from a UE 115 to a network entity 105, or both, among other configurations of transmissions. Carriers may carry downlink or uplink communications (such as in an FDD mode) or may be configured to carry downlink and uplink communications (such as in a TDD mode).

A carrier may be associated with a particular bandwidth of the RF spectrum and, in some implementations, the carrier bandwidth may be referred to as a "system bandwidth" of the carrier or the wireless communications system 100. For example, the carrier bandwidth may be one of a set of bandwidths for carriers of a particular radio access technology (such as 1.4, 3, 5, 10, 15, 20, 40, or 80 megahertz (MHz)). Devices of the wireless communications system 100 (such as the network entities 105, the UEs 115, or both) may have hardware configurations that support communications using a particular carrier bandwidth or may be configurable to support communications using one of a set of carrier bandwidths. In some implementations, the wireless communications system 100 may include network entities 105 or UEs 115 that support concurrent communications using carriers associated with multiple carrier bandwidths. In some implementations, each served UE 115 may be configured for operating using portions (such as a sub-band, a BWP) or all of a carrier bandwidth.

Signal waveforms transmitted via a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the network entities 105 or the UEs 115 may be expressed in multiples of a basic time unit which may, in some implementations, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (such as using a carrier) and may be associated with an identifier for distinguishing neighboring cells (such as a physical cell identifier (PCID), a virtual cell identifier (VCID), or others). In some implementations, a cell also may refer to a coverage area 110 or a portion of a coverage area 110 (such as a sector) over which the logical communication entity operates. Such cells may range from smaller areas (such as a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (such as several kilometers in radius) and may allow unrestricted access by the UEs 115 with service subscriptions with the network provider supporting the macro cell. A small cell may be associated with a lower-powered network entity 105 (such as a lower-powered BS 140), as compared with a macro cell, and a small cell may operate using the same or different (such as licensed, unlicensed) frequency bands as macro cells. Small cells may provide unrestricted access to the UEs 115 with service subscriptions with the network provider or may provide restricted access to the UEs 115 having an association with the small cell (such as the UEs 115 in a closed subscriber group (CSG), the UEs 115 associated with users in a home or office). A network entity 105 may support one or multiple cells and also may support communications via the one or more cells using one or multiple component carriers.

In some implementations, a carrier may support multiple cells, and different cells may be configured according to different protocol types (such as MTC, narrowband IoT (NB-IoT), enhanced mobile broadband (eMBB)) that may provide access for different types of devices.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BS s 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be according to a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

In some implementations, transmissions by a device (such as by a network entity 105 or a UE 115) may be performed using multiple beam directions, and the device may use a combination of digital precoding or beamforming to generate a combined beam for transmission (such as from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (such as a cell-specific reference signal (CRS), a CSI-RS), which may be precoded or unprecoded. The UE 115 may provide feedback for beam selection, which may be a precoding matrix indicator (PMI) or codebook-based feedback (such as a multi-panel type codebook, a linear combination type codebook, a port selection type codebook). Although these techniques are described with reference to signals transmitted along one or more directions by a network entity 105 (such as a BS 140, an RU 170), a UE 115 may employ similar techniques for transmitting signals multiple times along different directions (such as for identifying a beam direction for subsequent transmission or reception by the UE 115) or for transmitting a signal along a single direction (such as for transmitting data to a receiving device).

A receiving device (such as a UE 115) may perform reception operations in accordance with multiple receive configurations (such as directional listening) when receiving various signals from a receiving device (such as a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (such as different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (such as when receiving a data signal). The single receive configuration may be aligned along a beam direction determined according to listening according to different receive configuration directions (such as a beam direction determined to have a highest signal strength, highest signal-to-noise ratio (SNR), or otherwise acceptable signal quality according to listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Retransmission protocols, such as hybrid automatic repeat request (HARQ), also may offer performance gains. A HARQ protocol may support various HARQ signaling between transmitting and receiving wireless communication devices as well as signaling between the PHY and MAC layers to improve retransmission operations in the wireless communications system 100. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some implementations, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in the wireless communications system 100 may improve reliability of data communicated from a transmitting device to a receiving device. The HARQ protocol may support the establishment of a HARQ session between the two devices. Once a HARQ session is established, if a receiving device cannot properly decode (and cannot correct the errors) a first HARQ transmission received from the transmitting device, the receiving device may transmit a HARQ feedback message to the transmitting device (such as a negative acknowledgement (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some implementations, the receiving device may be enabled to control whether to continue the HARQ process or revert to a non-HARQ retransmission scheme (such as an ARQ protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

The wireless communications system 100 may support fast SCell activation using an AP-TRS, which may be triggered by a MAC-CE that activates an SCell. An AP-TRS may be used to accelerate the downlink loop initialization of a UE 115 on the SCell in accordance with one or more coarse or fine AGC, FTL, and TTL operations. In some aspects, a network entity may schedule downlink data on an SCell in accordance with CSI feedback received from a UE 115. However, when periodic CSI reporting is configured for an SCell to be activated, a scheduling of downlink data can be delayed because a UE 115 may have to wait until a next available set of CMRs and IMRs to perform CSI measurements.

In some implementations, a UE 115 may receive, via a set of physical downlink shared channel (PDSCH) resources associated with a first cell, at least one MAC-CE that activates a second cell (different from the first cell) and triggers AP-CSI reporting for the second cell. The UE 115 may receive, in accordance with the at least one MAC-CE, one or more aperiodic reference signals (such as one or more aperiodic CSI-RSs or one or more SSBs) via at least one AP-CMR/IMR pair associated with the second cell. Accordingly, the UE 115 may generate and transmit an AP-CSI report associated with a measurement of the one or more aperiodic reference signals received via the at least one AP-CMR/IMR pair. As such, the UE 115 may activate the second cell and enable downlink data scheduling on the second cell within a relatively short time span, thereby enabling the UE 115 and the network entity 105 to attain higher throughput levels by using the second cell for subsequent communications.

Figure 2:
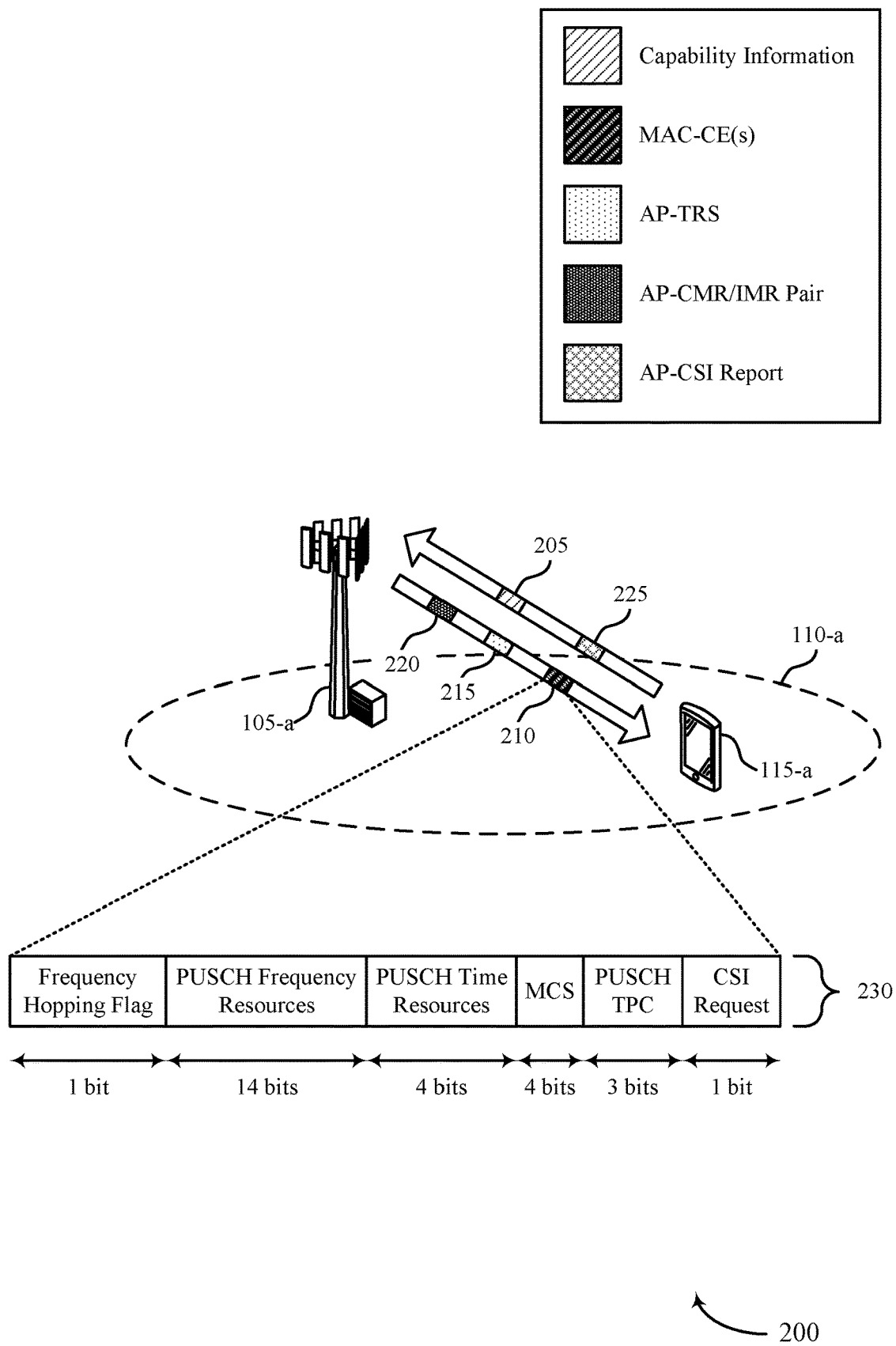
FIG. 2 shows an example signaling diagram that supports CSI reporting techniques for SCell activation.

FIG. 2 shows an example signaling diagram 200 that supports CSI reporting techniques for SCell activation. The signaling diagram 200 may implement or be implemented by aspects of the wireless communications system 100. For example, the signaling diagram 200 includes a UE 115-a, which may be an example of one or more aspects of a UE 115 as described herein, including with reference to FIG. 1. The signaling diagram 200 also includes a network entity 105-a, which may be an example of one or more aspects of a network entity 105 as described herein, including with reference to FIG. 1. The UE 115-a and the network entity 105-a may communicate within a coverage area 110-a, which may be an example of one or more aspects of a coverage area 110 as described herein, including with reference to FIG. 1. In the signaling diagram 200, the network entity 105-a may trigger AP-CSI reporting for the UE 115-a during an SCell activation process, which may enable the UE 115-a to report CSI with greater efficiency and reduced latency, among other benefits.

In the example of FIG. 2, the UE 115-a may transmit capability information 205 to the network entity 105-a. The capability information 205 may indicate a slot timing value associated with a downlink synchronization capability of the UE 115-a, such as a threshold quantity of slots between a reception of an AP-TRS 215 and a completion of an initial downlink synchronization process at the UE 115-a. The slot timing value may be an integer between 0 and a threshold value (which may be denoted as $T_{sync,max}$) that denotes a maximum time for the UE 115-a to complete downlink synchronization according to the AP-TRS 215. In other words, the UE 115-a may indicate a slot timing value as an integer from a set $\{0, 1, 2, \ldots T_{sync,max}\}$. If, for example, the UE 115-a indicates a slot timing value of 0, the network entity 105-a may schedule the AP-TRS 215 and an AP-CMR/IMR pair 220 in a same slot. For further example, the network entity 105-a may schedule the AP-CMR/IMR pair 220 in a next slot after the AP-TRS 215 if the UE 115-a indicates a slot timing value of 1, two slots after the AP-TRS 215 if the UE 115-a indicates a slot timing value of 2, and so on. Additionally, or alternatively, the network entity 105-a may schedule the AP-CMR/IMR pair 220 according to a downlink resource availability of the network entity 105—For example, the network entity 105-a may use or interpret the slot timing value indicated by the UE 115-a via the capability information 205 as a minimum quantity of slots between an AP-TRS 215 and an AP-CMR/IMR pair 220 and may select, identify, ascertain, or otherwise determine during which slot to actually schedule an AP-CMR/IMR pair 220 in accordance with a downlink resource availability at the network entity 105-a.

The network entity 105-a may transmit one or more MAC-CEs 210 to the UE 115-a and, in some implementations, the one or more MAC-CEs 210 may indicate an activation command for an SCell, an AP-TRS trigger, and an AP-CSI reporting trigger. The AP-TRS trigger may indicate a first set of time and frequency resource locations corresponding to the AP-TRS 215 and the AP-CSI reporting trigger may indicate a second set of time and frequency resource locations corresponding to the AP-CMR/IMR pair 220. In some implementations, the network entity 105-a may indicate the second set of time and frequency resource locations with respect to the first set of time and frequency resources using, for example, a slot offset. In some aspects, the network entity 105-a may set the slot offset in accordance with the slot timing value associated with the downlink synchronization capability of the UE 115-a and the downlink resource availability at the network entity 105-a.

In some implementations, the one or more MAC-CEs 210 (which trigger AP-CSI reporting for the UE 115-a during SCell activation) may include an uplink grant 230 that indicates a set of PUSCH resources for the UE 115-a to use to transmit an AP-CSI report 225. In some aspects, the uplink grant 230 may include a set of bits (such as a total of 27 bits) that are partitioned into a frequency hopping flag field (which may be a 1-bit field), a PUSCH frequency resource field (which may be a 14-bit field), a PUSCH time resource field (which may be a 4-bit field), a modulation and coding scheme (MCS) field (which may be a 4-bit field), a PUSCH transmission power control (TPC) field (which may be a 3-bit field), and a CSI request field (which may be a 1-bit field). The uplink grant 230 may facilitate PUSCH scheduling for AP-CSI reporting. In some aspects, the format of the uplink grant 230 may be similar to the format of an uplink grant included in a msg2 of a random access procedure.

The network entity 105-a may use a time offset (such as a K2 offset) to indicate the PUSCH resources allocated by the uplink grant 230 and may define the time offset relative to one of various reference points associated with SCell activation. In some implementations, the time offset may be defined relative to a location of the AP-CMR/IMR pair 220 (such as a slot associated with the AP-CMR/IMR pair 220). In some other implementations, the time offset may be defined relative to a slot (which may be denoted as a slot n+k+1) that is 3 milliseconds after the UE 115-a transmits HARQ-ACK feedback for the one or more PDSCH transmissions carrying the one or more MAC-CEs 210. For example, for a timing advance command received in an uplink slot (which may be denoted as an uplink slot n), transmissions other than a PUSCH transmission scheduled by a random access response (RAR) uplink grant or a fallback RAR uplink grant, and PUSCH transmissions with HARQ-ACK feedback information associated with a successful RAR, the corresponding adjustment of uplink transmission timing may be applied from the beginning of the uplink slot n+k+1, where k may be defined according to Equation 1.

$$k = [N_{slot}^{subframe,\mu} \times (N_{T,1} + N_{T,2} + N_{TA,max} + 0.5)/T_{sf}] \quad (1)$$

In Equation 1, $N_{T,1}$ may be a time duration (in milliseconds) of $N_1$ symbols corresponding to a PDSCH processing time for a UE processing capability when additional PDSCH demodulation reference signals (DMRS) are configured, $N_{T,2}$ may be a time duration (in milliseconds) of $N_2$ symbols corresponding to a PUSCH preparation time for the UE processing capability, $N_{TA,max}$ may be a maximum timing advance value (in milliseconds) that can be provided by a TA command field of 12 bits, $N_{slot}^{subframe,\mu}$ may be a number of slots per subframe, and $T_{sf}$ may be a sub-frame duration of 1 millisecond. In some implementations, the uplink grant 230 may schedule the PUSCH resources on a cell used for the transmission of the one or more MAC-CEs 210 that trigger the SCell activation and AP-CSI reporting for the UE 115-a, where such a cell may be a PCell or a primary secondary cell (PScell). Additionally, or alternatively, the uplink grant 230 may schedule the PUSCH resources on another activated uplink SCell of the UE 115-a or the uplink SCell that is to be activated for the UE 115-a (such as the SCell indicated by the SCell activation command).

The UE 115-a may receive the AP-TRS 215 from the network entity 105-a in accordance with the AP-TRS trigger indicated by the one or more MAC-CEs 210, and may use the AP-TRS 215 to perform AGC, FTL, TTL, and other downlink loop initialization processes for the SCell indicated by the SCell activation command. The UE 115-a may receive one or more reference signals via the AP-CMR/IMR pair 220 in accordance with the AP-CSI reporting trigger indicated by the one or more MAC-CEs 210, and may generate an AP-CSI report 225 according to the measurement of the AP-CMR/IMR pair 220. The UE 115-a may transmit the AP-CSI report 225 using the PUSCH resources indicated by the uplink grant 230 and the network entity 105-a may activate the SCell and begin scheduling downlink traffic, to the UE 115-a, on the activated SCell in accordance with receiving the AP-CSI report 225 from the UE 115-a.

Figure 3:
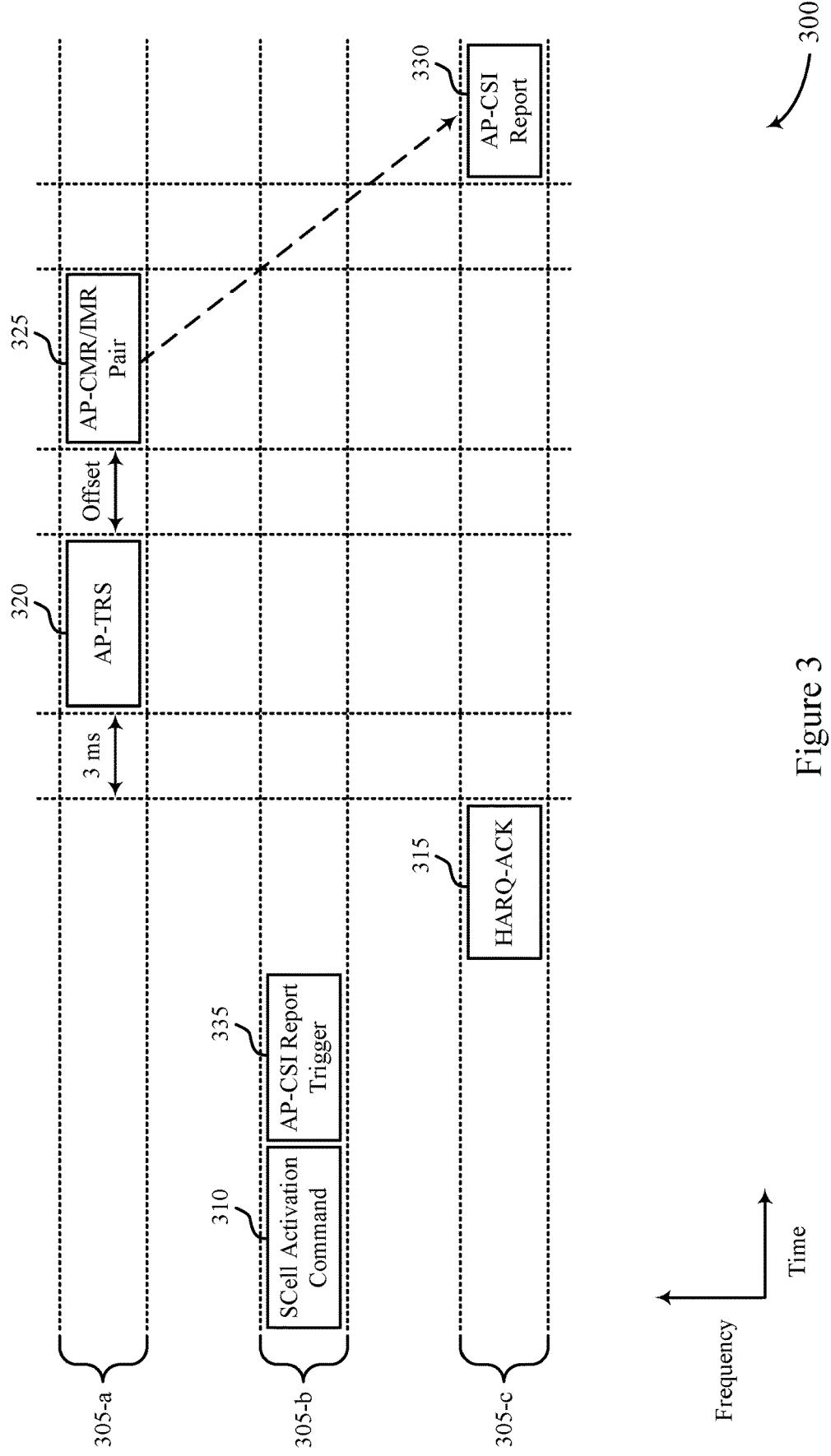
FIG. 3 shows an example resource diagram that supports CSI reporting techniques for SCell activation.

FIG. 3 shows an example resource diagram 300 that supports CSI reporting techniques for SCell activation. The resource diagram 300 may implement or be implemented by aspects of the wireless communications system 100 or the signaling diagram 200. For example, the resource diagram 300 may be implemented for communication between a UE 115 and a network entity 105. The UE 115 may be an example of the UE 115 or the UE 115-a as illustrated by and described with reference to FIGS. 1 and 2. The network entity 105 may be an example of the network entity 105 or the network entity 105-a as illustrated by and described with reference to FIGS. 1 and 2. The resource diagram 300 includes a carrier 305-a (such as an SCell downlink carrier), a carrier 305-b (such as a PCell downlink carrier), and a carrier 305-c (such as a PCell uplink carrier). In the resource diagram 300, a UE 115 may receive an SCell activation command 310 and an AP-CSI report trigger 335 from a network entity 105 via one or more MAC-CEs, such as via the one or more MAC-CEs 210 as illustrated by and described with reference to FIG. 2.

As described herein, including with reference to FIGS. 1 and 2, a PDSCH transmission with a MAC-CE for SCell activation also can trigger AP-CSI reporting for the SCell. In some implementations, an AP-CMR/IMR pair 325 (which the UE 115 may use to perform CSI measurements associated with the SCell) may be scheduled in the same slot as an AP-TRS 320 or in a subsequent slot, where the AP-CMR/IMR pair 325 may be an example of the AP-CMR/IMR pair 220, as illustrated by and described with reference to FIG. 2, and the AP-TRS 320 may be an example of the AP-TRS 215, as also illustrated by and described with reference to FIG. 2.

The UE 115 may measure CSI using the AP-CMR/IMR pair 325 and may transmit a corresponding AP-CSI report 330 on a set of PUSCH resources indicated by the AP-CSI report trigger 335. Although indicated as being transmitted via the PCell, the UE 115 may transmit the AP-CSI report 330 via the activated SCell or another SCell (such as another, previously activated SCell) supported by the UE 115 and the network entity 105. Thereafter, the network entity 105 may begin scheduling PDSCH traffic for the UE 115 on the activated SCell.

In some implementations, the network entity 105 may transmit the SCell activation command 310, an AP-TRS trigger, and the AP-CSI report trigger 335 via an integrated MAC-CE. In some other implementations, the network entity 105 may transmit a first MAC-CE that indicates the SCell activation command 310 along with the AP-TRS trigger, and may transmit a second MAC-CE that indicates the AP-CSI report trigger 335. In other words, the network entity 105 may include the SCell activation command 310 and the AP-CSI report trigger 335 in the same MAC-CE or in different MAC-CEs.

To facilitate the joint AP-CMR/IMR triggering mechanisms disclosed herein, the network entity 105 may configure multiple AP-CMR/IMR resources for fast CSI reporting when an SCell is enabled for the UE 115. In some implementations, separate AP-CMR/IMR resources may be configured for fast CSI reporting at the UE 115, where fast CSI reporting may refer to CSI reporting that is triggered by the AP-CSI report trigger 335 sent in the same MAC-CE as the SCell activation command 310 or in a different MAC-CE that is sent within a threshold time duration from the MAC-CE including the SCell activation command 310. Additionally, or alternatively, AP-CMR/IMR resources that are configured for a deactivated SCell may be reused for fast CSI reporting at the UE 115. In other words, the UE 115 may receive a configuration, such as an RRC configuration, of a set of AP-CMR/IMR resources, where the set of AP-CMR/IMR resources may be dedicated for fast CSI reporting or shared with other CSI reporting techniques supported by the UE 115. In some implementations, the one or more MAC-CEs that trigger the AP-CSI reporting during SCell activation may indicate one AP-CMR/IMR pair 325 and the UE 115 may use the one AP-CMR/IMR pair 325 for CSI measurements. For example, the UE 115 may be configured with a set of CMRs and a set of IMRs and the AP-CSI report trigger 335 may indicate one CMR from the set of CMRs and one IMR from the set of IMRs to be used for the triggered CSI measurement.

The UE 115 may transmit HARQ-ACK feedback information 315 associated with one or both of the SCell activation command 310 or the AP-CSI report trigger 335. If, for example, the UE receives the SCell activation command 310 and the AP-CSI report trigger 335 in separate MAC-CEs, the UE may report the HARQ-ACK feedback information 315 for the SCell activation command 310 and the AP-CSI report trigger 335 in separate PUSCH transmissions. Alternatively, if the UE receives the SCell activation command 310 and the AP-CSI report trigger 335 via an integrated MAC-CE, the UE may report the HARQ-ACK feedback information 315 for the SCell activation command 310 and the AP-CSI report trigger 335 in the same PUSCH transmission.

In some implementations, there may be a time duration of approximately 3 milliseconds between a slot allocated for transmission of the HARQ-ACK feedback information 315 and a slot allocated for transmission of the AP-TRS 320. Additionally, or alternatively, there may be a time offset between the slot allocated for transmission of the AP-TRS 320 and a slot allocated for the AP-CMR/IMR pair 325 (during which the network entity 105 may transmit one or more reference signals). The network entity 105 may select, identify, ascertain, or otherwise determine a duration of the time offset between the AP-TRS 320 and the AP-CMR/IMR pair 325 in accordance with a downlink synchronization capability of the UE or a downlink resource availability of the network entity, or both.

Aspects of the subject matter disclosed in the preceding description of the resource diagram 300 can be implemented to realize one or more of the following potential advantages. For example, the techniques and signaling mechanisms described with reference to FIG. 3 may reduce the latency of SCell activation processes by enabling a network entity 105 to jointly activate an SCell and trigger AP-CSI reporting for the SCell. More specifically, the network entity may transmit at least one MAC-CE that indicates an activation command for the SCell and at least one AP-CMR/IMR to use for AP-CSI measurements associated with the SCell, which may enable the UE to generate and report CSI to the network entity with decreased latency. As a result, the UE may activate the SCell in a relatively shorter timeframe, thereby enabling the UE and the network entity to attain higher throughput levels by using the activated SCell for subsequent communications.

Figure 4:
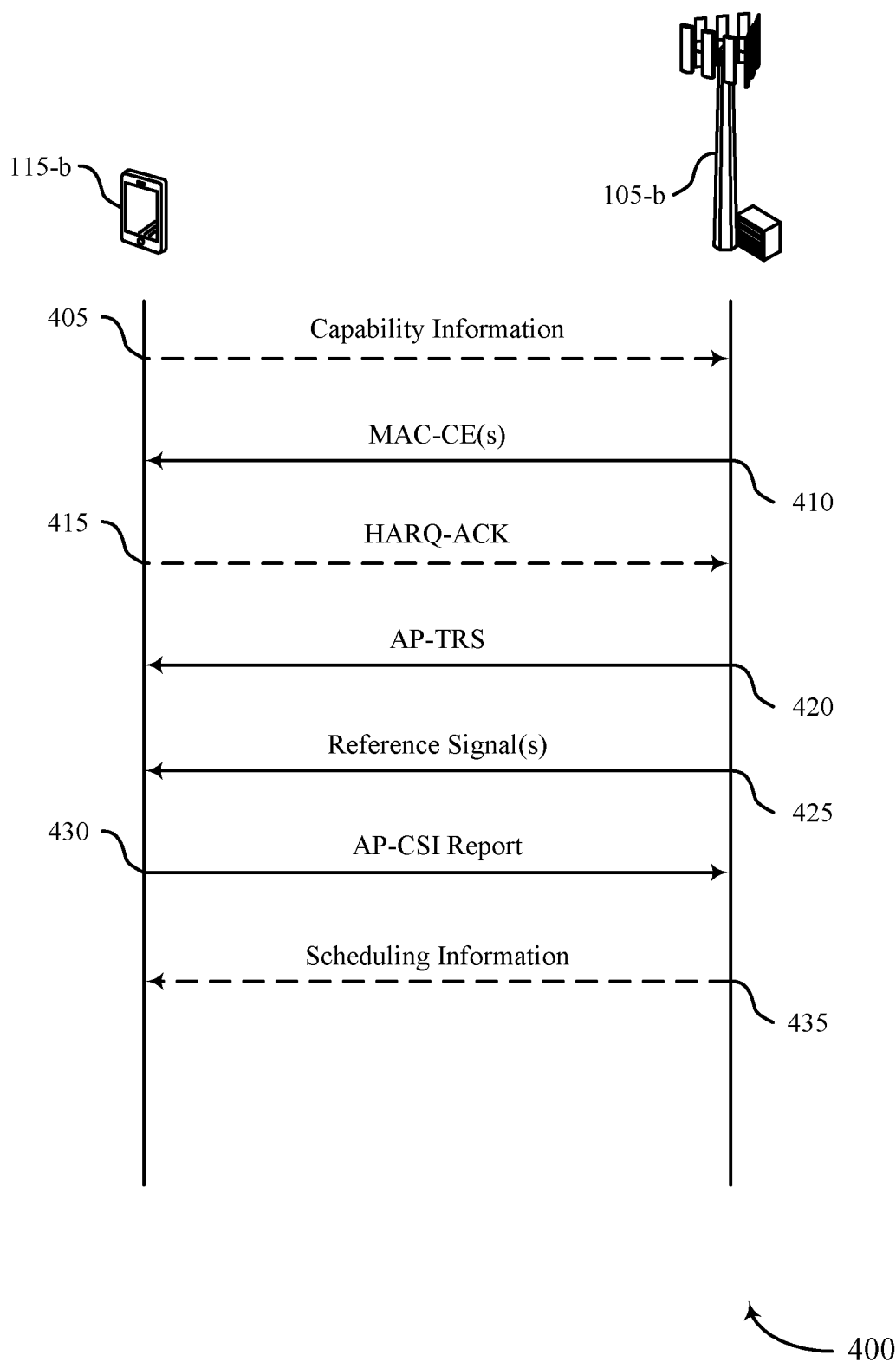
FIG. 4 shows an example process flow that supports CSI reporting techniques for SCell activation.

FIG. 4 shows an example process flow 400 that supports CSI reporting techniques for SCell activation. The process flow 400 may implement or be implemented by one or more aspects of the wireless communications system 100, the signaling diagram 200, or the resource diagram 300. For example, the process flow 400 includes a UE 115-*b*, which may be an example of one or more aspects of a UE 115 or a UE 115-*a* as illustrated by and described with reference to FIGS. 1 and 2. The process flow 400 also includes a network entity 105-*b*, which may be an example of one or more aspects of a network entity 105 or a network entity 105-*a* as illustrated by and described with reference to FIGS. 1 and 2. In the following description of the process flow 400, operations between the UE 115-*b* and the network entity 105-*b* may be added, omitted, or performed in a different order (with respect to the order shown in the example of FIG. 4).

At 405, the UE 115-*b* may transmit capability information (such as the capability information 205 as illustrated by and described with reference to FIG. 2) to the network entity 105-*b*. The capability information may indicate a threshold time duration (such as in terms of a quantity of slots) between a reception of an AP-TRS and a measurement of an AP-CMR/IMR pair. The UE 115-*b* may signal the threshold time duration, which may be referred to as a slot timing value, as an integer value between 0 and a maximum synchronization value of the UE 115-*b*. The network entity 105-*b* may use the capability information provided by the UE 115-*b*, along with a downlink resource availability of the network entity 105-*b*, to schedule an AP-TRS and an AP-CMR/IMR pair for the UE 115-*b*.

At 410, the UE 115-*b* may receive one or more MAC-CEs (such as the one or more MAC-CEs 210 as illustrated by and described with reference to FIG. 2) from the network entity 105-*b*. The one or more MAC-CEs may include an SCell activation command (such as the SCell activation command 310 as illustrated by and described with reference to FIG. 3), an AP-TRS trigger, and an AP-CSI report trigger (such as the AP-CSI report trigger 335 as illustrated by and described with reference to FIG. 3). In some implementations, the network entity 105-*b* may include the SCell activation command, the AP-TRS trigger, and the AP-CSI report trigger in a single MAC-CE. In some other implementations, the network entity 105-*b* may include the SCell activation command and the AP-CSI report trigger in separate MAC-CEs.

In some implementations, the UE 115-*b* may transmit HARQ-ACK feedback information (such as the HARQ-ACK feedback information 315 described with reference to FIG. 3) to the network entity 105-*b* at 415. The HARQ-ACK feedback information may indicate whether the UE 115-*b* successfully received the one or more MAC-CEs carrying the SCell activation command, the AP-TRS trigger, and the AP-CSI report trigger. At 420, the UE 115-*b* may receive at least one AP-TRS (such as the AP-TRS 320 as illustrated by and described with reference to FIG. 3) from the network entity 105-*b* in accordance with the AP-TRS trigger indicated by the one or more MAC-CEs. The UE 115-*b* may use the at least one AP-TRS to perform AGC, FTL, TTL, and other downlink loop initialization processes for the SCell indicated by the SCell activation command.

At 425, the UE 115-*b* may perform a measurement of at least one reference signal via (such as using) the AP-CMR/IMR pair (such as the AP-CMR/IMR pair 220 or the AP-CMR/IMR pair 325 as illustrated by and described with reference to FIG. 2) in accordance with the AP-CSI report trigger indicated by the one or more MAC-CEs. The UE 115-*b* may use the measurement of the at least one reference signal via the AP-CMR/IMR pair to derive or otherwise generate CSI associated with the SCell indicated by the SCell activation command. At 430, the UE 115-*b* may transmit an AP-CSI report that includes or indicates the CSI measurements associated with the SCell. In some implementations, the network entity 105-*b* may begin scheduling downlink traffic on the SCell upon receiving the AP-CSI report from the UE 115-*b*, and may transmit PDSCH scheduling information to the UE 115-*b* at 435.

Aspects of the subject matter disclosed in the preceding description of the process flow 400 can be implemented to realize one or more of the following potential advantages. For example, the techniques and signaling mechanisms described with reference to FIG. 4 may reduce the latency of SCell activation procedures by enabling the network entity 105-*b* to jointly activate an SCell and trigger AP-CSI reporting for the SCell. More specifically, the network entity 105-*b* may transmit at least one MAC-CE that indicates an activation command for the SCell and at least one AP-CMR/IMR pair to use for AP-CSI measurements associated with the SCell, which may enable the UE 115-*b* to generate and report CSI to the network entity with decreased latency. As a result, the UE 115-*b* may activate the SCell in a relatively shorter time span, thereby enabling the UE 115-*b* and the network entity 105-*b* to attain higher throughput levels by using the activated SCell for subsequent communications.

Figure 5:
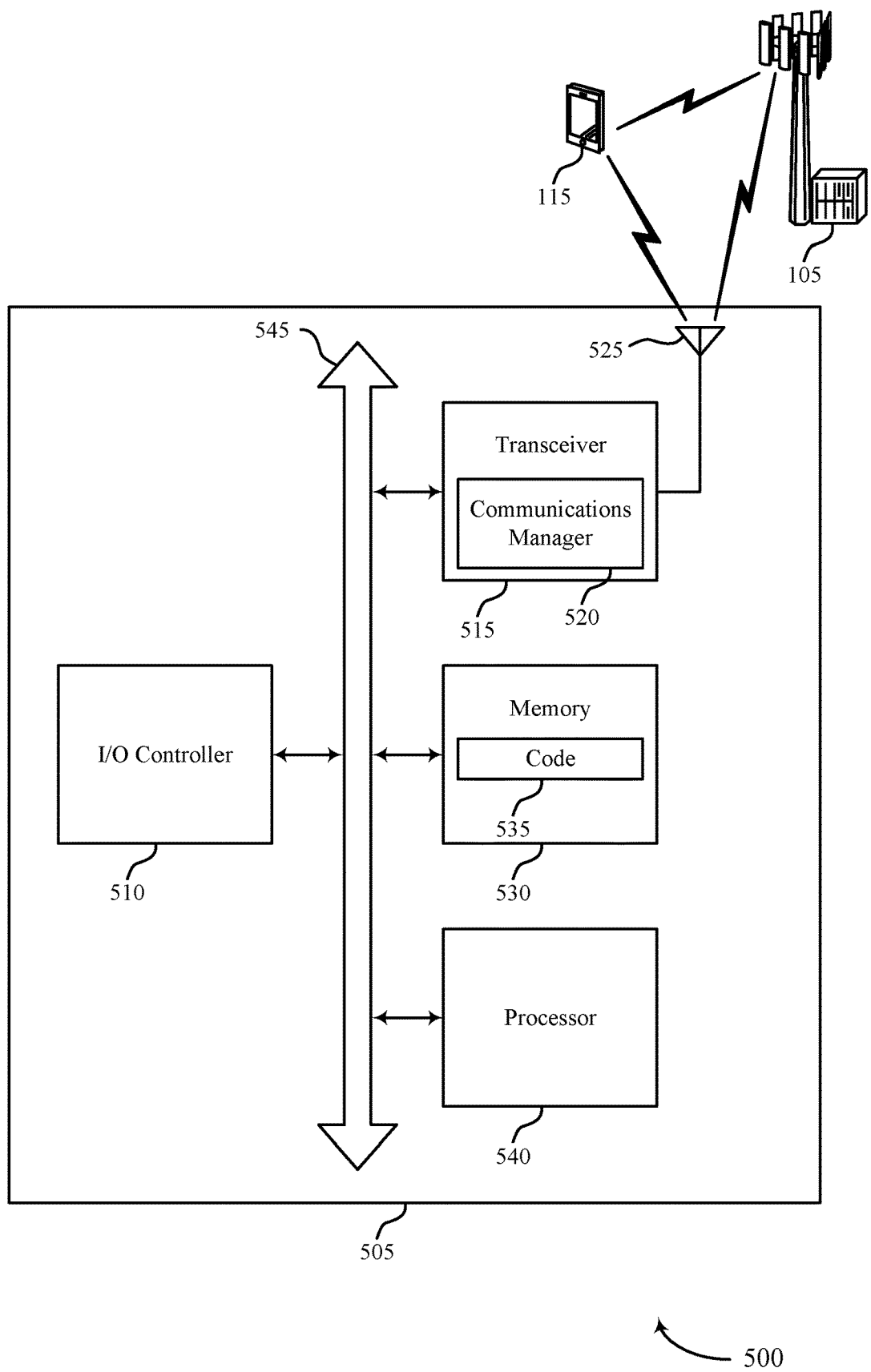
FIGS. 5 and 6 show block diagrams of example devices that support CSI reporting techniques for SCell activation.

FIG. 5 shows a block diagram 500 of an example device 505 that supports CSI reporting techniques for SCell activation. The device 505 may communicate (such as wirelessly) with one or more network entities (such as one or more components of one or more network entities 105), one or more UEs 115, or any combination thereof. The device 505 may include components for bi-directional voice and data communications including components for transmitting and receiving communications, such as a communications manager 520, an input/output (I/O) controller 510, a transceiver 515, an antenna 525, a memory 530, code 535, and a processor 540. These components may be in electronic communication or otherwise coupled (such as operatively, communicatively, functionally, electronically, electrically) via one or more buses (such as a bus 545).

The I/O controller 510 may manage input and output signals for the device 505. The I/O controller 510 also may manage peripherals not integrated into the device 505. In some implementations, the I/O controller 510 may represent a physical connection or port to an external peripheral. In some implementations, the I/O controller 510 may utilize an operating system such as iOS®, ANDROID®, MS-DOS®, MS-WINDOWS®, OS/2®, UNIX®, LINUX®, or another known operating system. Additionally, or alternatively, the I/O controller 510 may represent or interact with a modem, a keyboard, a mouse, a touchscreen, or a similar device. In some implementations, the I/O controller 510 may be implemented as part of a processor or processing system, such as the processor 540. In some implementations, a user may interact with the device 505 via the I/O controller 510 or via hardware components controlled by the I/O controller 510.

In some implementations, the device 505 may include a single antenna 525. However, in some other implementations, the device 505 may have more than one antenna 525, which may be capable of concurrently transmitting or receiving multiple wireless transmissions. The transceiver 515 may communicate bi-directionally, via the one or more antennas 525, wired, or wireless links as described herein. For example, the transceiver 515 may represent a wireless transceiver and may communicate bi-directionally with another wireless transceiver. The transceiver 515 also may include a modem to modulate the packets, to provide the modulated packets to one or more antennas 525 for transmission, and to demodulate packets received from the one or more antennas 525.

In some implementations, the transceiver 515 may include one or more interfaces, such as one or more interfaces coupled with the one or more antennas 525 that are configured to support various receiving or obtaining operations, or one or more interfaces coupled with the one or more antennas 525 that are configured to support various transmitting or outputting operations, or a combination thereof. In some implementations, the transceiver 515 may include or be configured for coupling with one or more processors or memory components that are operable to perform or support operations according to received or obtained information or signals, or to generate information or other signals for transmission or other outputting, or any combination thereof. In some implementations, the transceiver 515, or the transceiver 515 and the one or more antennas 525, or the transceiver 515 and the one or more antennas 525 and one or more processors or memory components (such as the processor 540, or the memory 530, or both), may be included in a chip or chip assembly that is installed in the device 505.

The memory 530 may include random access memory (RAM) and read-only memory (ROM). The memory 530 may store computer-readable, computer-executable code 535 including instructions that, when executed by the processor 540, cause the device 505 to perform various functions described herein. The code 535 may be stored in a non-transitory computer-readable medium such as system memory or another type of memory. In some implementations, the code 535 may not be directly executable by the processor 540 but may cause a computer (such as when compiled and executed) to perform functions described herein. In some implementations, the memory 530 may contain, among other things, a basic I/O system (BIOS) which may control basic hardware or software operation such as the interaction with peripheral components or devices.

The processor 540 may include an intelligent hardware device (such as a general-purpose processor, a digital signal processor (DSP), an application-specific integrated circuit (ASIC), a central processing unit (CPU), a graphics processing unit (GPU), a field-programmable gate array (FPGA), a microcontroller, a programmable logic device, discrete gate or transistor logic, a discrete hardware component, or any combination thereof). In some scenarios, the processor 540 may be configured to operate a memory array using a memory controller. In some other scenarios, a memory controller may be integrated into the processor 540. The processor 540 may be configured to execute computer-readable instructions stored in a memory (such as the memory 530) to cause the device 505 to perform various functions (such as functions or tasks supporting CSI reporting techniques for SCell activation). For example, the device 505 or a component of the device 505 may include a processor 540 and memory 530 coupled with the processor 540, the processor 540 and memory 530 configured to perform various functions described herein. The processor 540 may be an example of a cloud-computing platform (such as one or more physical nodes and supporting software such as operating systems, virtual machines, or container instances) that may host the functions (such as by executing code 535) to perform the functions of the device 505.

The processor 540 may be any one or more suitable processors capable of executing scripts or instructions of one or more software programs stored in the device 505 (such as within the memory 530). In some implementations, the processor 540 may be a component of a processing system. A processing system may generally refer to a system or series of machines or components that receives inputs and processes the inputs to produce a set of outputs (which may be passed to other systems or components of, for example, the device 505). For example, a processing system of the device 505 may refer to a system including the various other components or subcomponents of the device 505, such as the processor 540, or the transceiver 515, or the communications manager 520, or other components or combinations of components of the device 505. The processing system of the device 505 may interface with other components of the device 505, and may process information received from other components (such as inputs or signals) or output information to other components. For example, a chip or modem of the device 505 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 505 may transmit information output from the chip or modem. Additionally, or alternatively, in some implementations, the one or more interfaces may refer to an interface between the processing system of the chip or modem and a receiver, such that the device 505 may obtain information or signal inputs, and the information may be passed to the processing system. A person having ordinary skill in the art will readily recognize that a first interface also may obtain information or signal inputs, and a second interface also may output information or signal outputs.

The communications manager 520 may support wireless communication at a UE in accordance with examples as disclosed herein. For example, the communications manager 520 may be configured as or otherwise support a means for receiving, via a first set of resources associated with a first cell, at least one MAC-CE that activates a second cell and triggers AP-CSI reporting for the second cell. The communications manager 520 may be configured as or otherwise support a means for receiving, in accordance with the at least one MAC-CE, one or more aperiodic reference signals via a second set of resources associated with the second cell. The communications manager 520 may be configured as or otherwise support a means for transmitting an AP-CSI report associated with a measurement of the one or more aperiodic reference signals.

In some implementations, to support receiving the at least one MAC-CE, the communications manager 520 may be configured as or otherwise support a means for receiving, via the at least one MAC-CE in accordance with the at least one MAC-CE activating the second cell, a first indication to trigger AP-TRS measurements for the second cell and a second indication to trigger the AP-CSI reporting for the second cell, where the at least one MAC-CE is a single MAC-CE, and where receiving the one or more aperiodic reference signals via the second set of resources is in accordance with the second indication.

In some implementations, to support receiving the at least one MAC-CE, the communications manager 520 may be configured as or otherwise support a means for receiving a first MAC-CE that activates the second cell and triggers AP-TRS measurements for the second cell. In some implementations, to support receiving the at least one MAC-CE, the communications manager 520 may be configured as or otherwise support a means for receiving a second MAC-CE that triggers the AP-CSI reporting for the second cell, where receiving the one or more aperiodic reference signals is in accordance with the second MAC-CE.

In some implementations, the communications manager 520 may be configured as or otherwise support a means for receiving an indication of multiple aperiodic CMRs and multiple aperiodic IMRs associated with the second cell via control signaling, where the multiple aperiodic CMRs and the multiple aperiodic IMRs include the second set of resources.

In some implementations, the indication of the multiple aperiodic CMRs and the multiple aperiodic IMRs indicates that the multiple aperiodic CMRs and the multiple aperiodic IMRs are exclusively associated with the AP-CSI reporting triggered by the at least one MAC-CE that activates the second cell. In some implementations, the at least one MAC-CE indicates the second set of resources from the multiple aperiodic CMRs and the multiple aperiodic IMRs, where the second set of resources includes an aperiodic CMR from the multiple aperiodic CMRs and an aperiodic IMR from the multiple aperiodic IMRs.

In some implementations, the communications manager 520 may be configured as or otherwise support a means for receiving at least one AP-TRS via a third set of resources associated with the second cell, where the at least one MAC-CE further triggers the at least one AP-TRS, and where the at least one MAC-CE that triggers the AP-CSI reporting indicates a time offset between the third set of resources and the second set of resources.

In some implementations, the communications manager 520 may be configured as or otherwise support a means for transmitting a message that indicates a quantity of slots associated with the time offset between the third set of resources and the second set of resources, where the quantity of slots is associated with a threshold duration of the time offset between the third set of resources and the second set of resources and is associated with a capability of the UE to acquire downlink synchronization using the at least one AP-TRS, and where the second set of resources are scheduled according to a downlink resource availability of a network entity.

In some implementations, the second set of resources and the third set of resources are scheduled in a same time slot if the message indicates a quantity of zero slots associated with the time offset between the third set of resources and the second set of resources. In some implementations, the communications manager 520 may be configured as or otherwise support a means for transmitting HARQ-ACK feedback for the at least one MAC-CE via a fourth set of resources associated with the first cell.

In some implementations, to support transmitting the AP-CSI report, the communications manager 520 may be configured as or otherwise support a means for transmitting the AP-CSI report via a set of PUSCH resources in accordance with a time offset between the set of PUSCH resources and the fourth set of resources, where the at least one MAC-CE that triggers the AP-CSI reporting indicates the set of PUSCH resources and the time offset between the set of PUSCH resources and the fourth set of resources.

In some implementations, to support transmitting the AP-CSI report, the communications manager 520 may be configured as or otherwise support a means for transmitting the AP-CSI report via a set of PUSCH resources in accordance with a time offset between the set of PUSCH resources and the second set of resources, where the at least one MAC-CE that triggers the AP-CSI reporting indicates the set of PUSCH resources and the time offset between the set of PUSCH resources and the second set of resources.

In some implementations, to support receiving the one or more aperiodic reference signals via the second set of resources, the communications manager 520 may be configured as or otherwise support a means for measuring CSI via at least one AP-CMR or AP-IMR associated with the second cell.

In some implementations, the communications manager 520 may be configured as or otherwise support a means for receiving downlink scheduling information associated with the second cell in accordance with the AP-CSI report from the UE. In some implementations, the communications manager 520 may be configured as or otherwise support a means for receiving, via the second cell, at least one downlink message in accordance with the downlink scheduling information.

In some implementations, to support transmitting the AP-CSI report, the communications manager 520 may be configured as or otherwise support a means for transmitting the AP-CSI report via a set of PUSCH resources associated with at least one of the first cell, the second cell, or a third cell that is activated for the UE.

In some implementations, the communications manager 520 may be configured to perform various operations (such as receiving, monitoring, transmitting) using or otherwise in cooperation with the transceiver 515, the one or more antennas 525, or any combination thereof. Although the communications manager 520 is illustrated as a component of the transceiver 515, in some implementations, one or more functions described with reference to the communications manager 520 may be supported by or performed by the transceiver 515, the processor 540, the memory 530, the code 535, or any combination thereof. For example, the code 535 may include instructions executable by the processor 540 to cause the device 505 to perform various aspects of CSI reporting techniques for SCell activation as described herein, or the processor 540 and the memory 530 may be otherwise configured to perform or support such operations.

Figure 6:
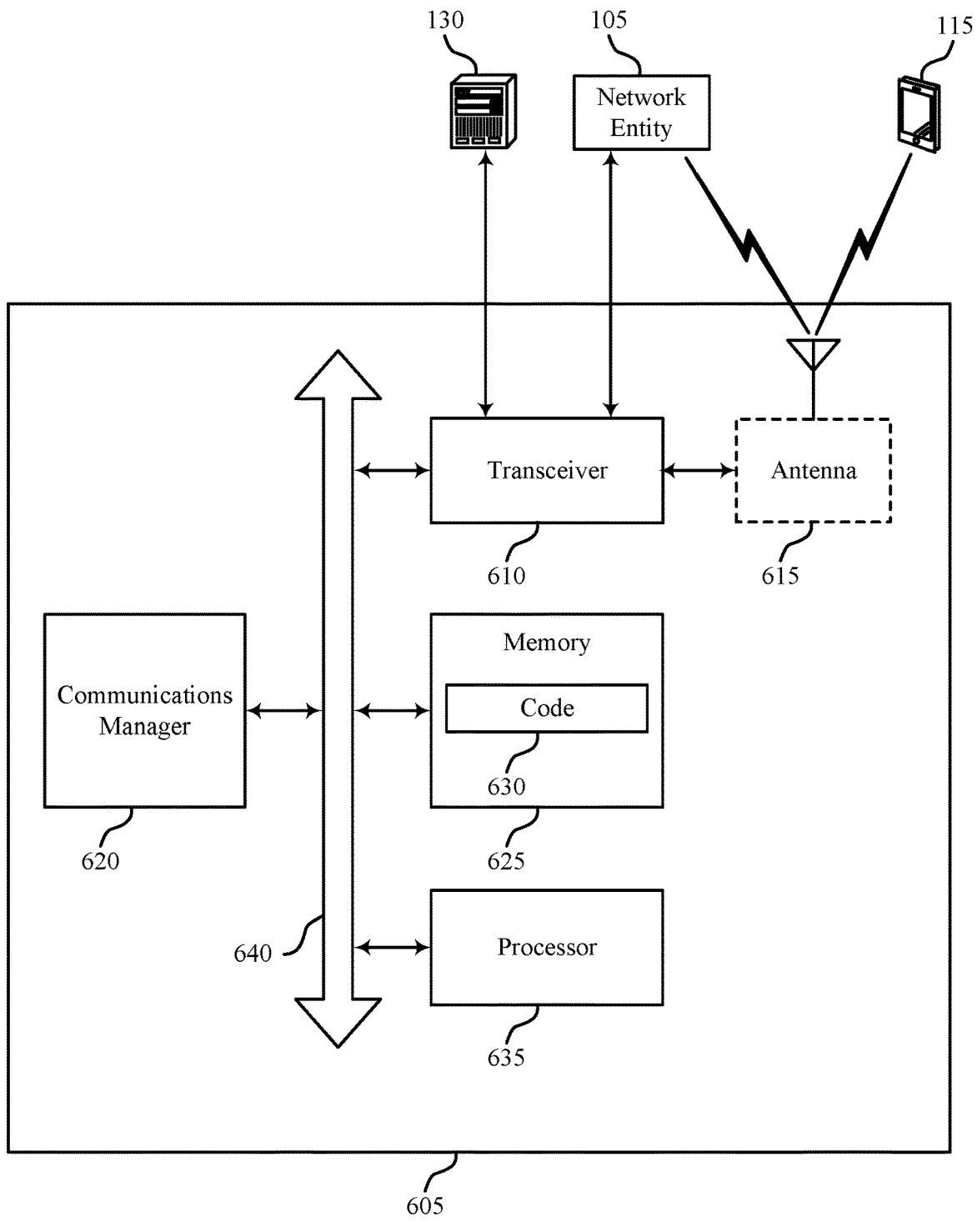

FIG. 6 shows a block diagram 600 of an example device 605 that supports CSI reporting techniques for SCell activation. The device 605 may communicate with one or more network entities (such as one or more components of one or more network entities 105), one or more UEs 115, or any combination thereof, which may include communications over one or more wired interfaces, over one or more wireless interfaces, or any combination thereof. The device 605 may include components that support outputting and obtaining communications, such as a communications manager 620, a transceiver 610, an antenna 615, a memory 625, code 630, and a processor 635. These components may be in electronic communication or otherwise coupled (such as operatively, communicatively, functionally, electronically, electrically) via one or more buses (such as a bus 640).

The transceiver 610 may support bi-directional communications via wired links, wireless links, or both as described herein. In some implementations, the transceiver 610 may include a wired transceiver and may communicate bi-directionally with another wired transceiver. Additionally, or alternatively, in some implementations, the transceiver 610 may include a wireless transceiver and may communicate bi-directionally with another wireless transceiver. In some implementations, the device 605 may include one or more antennas 615, which may be capable of transmitting or receiving wireless transmissions (such as concurrently).

The transceiver 610 also may include a modem to modulate signals, to provide the modulated signals for transmission (such as by one or more antennas 615, by a wired transmitter), to receive modulated signals (such as from one or more antennas 615, from a wired receiver), and to demodulate signals. In some implementations, the transceiver 610 may include one or more interfaces, such as one or more interfaces coupled with the one or more antennas 615 that are configured to support various receiving or obtaining operations, or one or more interfaces coupled with the one or more antennas 615 that are configured to support various transmitting or outputting operations, or a combination thereof.

In some implementations, the transceiver 610 may include or be configured for coupling with one or more processors or memory components that are operable to perform or support operations according to received or obtained information or signals, or to generate information or other signals for transmission or other outputting, or any combination thereof. In some implementations, the transceiver 610, or the transceiver 610 and the one or more antennas 615, or the transceiver 610 and the one or more antennas 615 and one or more processors or memory components (such as the processor 635, or the memory 625, or both), may be included in a chip or chip assembly that is installed in the device 605. In some implementations, the transceiver may be operable to support communications via one or more communications links (such as a communication link 125, a backhaul communication link 120, a midhaul communication link 162, a fronthaul communication link 168).

The memory 625 may include RAM and ROM. The memory 625 may store computer-readable, computer-executable code 630 including instructions that, when executed by the processor 635, cause the device 605 to perform various functions described herein. The code 630 may be stored in a non-transitory computer-readable medium such as system memory or another type of memory.

In some scenarios, the code 630 may not be directly executable by the processor 635 but may cause a computer (such as when compiled and executed) to perform functions described herein. In some scenarios, the memory 625 may contain, among other things, a BIOS which may control basic hardware or software operation such as the interaction with peripheral components or devices.

The processor 635 may include an intelligent hardware device (such as a general-purpose processor, a DSP, an ASIC, a CPU, a GPU, an FPGA, a microcontroller, a programmable logic device, discrete gate or transistor logic, a discrete hardware component, or any combination thereof). In some scenarios, the processor 635 may be configured to operate a memory array using a memory controller. In some other scenarios, a memory controller may be integrated into the processor 635. The processor 635 may be configured to execute computer-readable instructions stored in a memory (such as the memory 625) to cause the device 605 to perform various functions (such as functions or tasks supporting CSI reporting techniques for SCell activation). For example, the device 605 or a component of the device 605 may include a processor 635 and memory 625 coupled with the processor 635, the processor 635 and memory 625 configured to perform various functions described herein.

The processor 635 may be an example of a cloud-computing platform (such as one or more physical nodes and supporting software such as operating systems, virtual machines, or container instances) that may host the functions (such as by executing code 630) to perform the functions of the device 605. The processor 635 may be any one or more suitable processors capable of executing scripts or instructions of one or more software programs stored in the device 605 (such as within the memory 625). In some implementations, the processor 635 may be a component of a processing system. A processing system may generally refer to a system or series of machines or components that receives inputs and processes the inputs to produce a set of outputs (which may be passed to other systems or components of, for example, the device 605). For example, a processing system of the device 605 may refer to a system including the various other components or subcomponents of the device 605, such as the processor 635, or the transceiver 610, or the communications manager 620, or other components or combinations of components of the device 605.

The processing system of the device 605 may interface with other components of the device 605, and may process information received from other components (such as inputs or signals) or output information to other components. For example, a chip or modem of the device 605 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations.

In some implementations, the one or more interfaces may refer to an interface between the processing system of the chip or modem and a transmitter, such that the device 605 may transmit information output from the chip or modem. Additionally, or alternatively, in some implementations, the one or more interfaces may refer to an interface between the processing system of the chip or modem and a receiver, such that the device 605 may obtain information or signal inputs, and the information may be passed to the processing system.

A person having ordinary skill in the art will readily recognize that a first interface also may obtain information or signal inputs, and a second interface also may output information or signal outputs.

In some implementations, a bus 640 may support communications of (such as within) a protocol layer of a protocol stack. In some implementations, a bus 640 may support communications associated with a logical channel of a protocol stack (such as between protocol layers of a protocol stack), which may include communications performed within a component of the device 605, or between different components of the device 605 that may be co-located or located in different locations (such as where the device 605 may refer to a system in which one or more of the communications manager 620, the transceiver 610, the memory 625, the code 630, and the processor 635 may be located in one of the different components or divided between different components).

In some implementations, the communications manager 620 may manage aspects of communications with a core network 130 (such as via one or more wired or wireless backhaul links). For example, the communications manager 620 may manage the transfer of data communications for client devices, such as one or more UEs 115. In some implementations, the communications manager 620 may manage communications with other network entities 105, and may include a controller or scheduler for controlling communications with UEs 115 in cooperation with other network entities 105. In some implementations, the communications manager 620 may support an X2 interface within an LTE/LTE-A wireless communications network technology to provide communication between network entities 105.

The communications manager 620 may support wireless communication at a network entity in accordance with examples as disclosed herein. For example, the communications manager 620 may be configured as or otherwise support a means for transmitting, via a first set of resources associated with a first cell, at least one MAC-CE that activates a second cell and triggers AP-CSI reporting for the second cell. The communications manager 620 may be configured as or otherwise support a means for transmitting, in accordance with the at least one MAC-CE, one or more aperiodic reference signals via a second set of resources associated with the second cell. The communications manager 620 may be configured as or otherwise support a means for receiving an AP-CSI report associated with a measurement of the one or more aperiodic reference signals.

In some implementations, to support transmitting the at least one MAC-CE, the communications manager 620 may be configured as or otherwise support a means for transmitting, via the at least one MAC-CE in accordance with the at least one MAC-CE activating the second cell, a first indication to trigger AP-TRS measurements for the second cell and a second indication to trigger the AP-CSI reporting for the second cell, where the at least one MAC-CE is a single MAC-CE, and where transmitting the one or more aperiodic reference signals via the second set of resources is in accordance with the second indication.

In some implementations, to support transmitting the at least one MAC-CE, the communications manager 620 may be configured as or otherwise support a means for transmitting a first MAC-CE that activates the second cell and triggers AP-TRS measurements for the second cell. In some implementations, to support transmitting the at least one MAC-CE, the communications manager 620 may be configured as or otherwise support a means for transmitting a second MAC-CE that triggers the AP-CSI reporting for the second cell, where transmitting the one or more aperiodic reference signals is in accordance with the second MAC-CE.

In some implementations, the communications manager 620 may be configured as or otherwise support a means for transmitting an indication of multiple aperiodic CMRs and multiple aperiodic IMRs associated with the second cell via control signaling, where the multiple aperiodic CMRs and the multiple aperiodic IMRs include the second set of resources.

In some implementations, the indication of the multiple aperiodic CMRs and the multiple aperiodic IMRs indicates that the multiple aperiodic CMRs and the multiple aperiodic IMRs are exclusively associated with the AP-CSI reporting triggered by the at least one MAC-CE that activates the second cell. In some implementations, the at least one MAC-CE indicates the second set of resources from the multiple aperiodic CMRs and the multiple aperiodic IMRs, where the second set of resources includes an aperiodic CMR from the multiple aperiodic CMRs and an aperiodic IMR from the multiple aperiodic IMRs.

In some implementations, the communications manager 620 may be configured as or otherwise support a means for transmitting at least one AP-TRS via a third set of resources associated with the second cell, where the at least one MAC-CE further triggers the at least one AP-TRS, and where the at least one MAC-CE that triggers the AP-CSI reporting indicates a time offset between the third set of resources and the second set of resources.

In some implementations, the communications manager 620 may be configured as or otherwise support a means for receiving a message that indicates a quantity of slots associated with the time offset between the third set of resources and the second set of resources, where the quantity of slots is associated with a threshold duration of the time offset between the third set of resources and the second set of resources and is associated with a capability of a UE to acquire downlink synchronization using the at least one AP-TRS, and where the second set of resources are scheduled according to a downlink resource availability of the network entity.

In some implementations, the second set of resources and the third set of resources are scheduled in a same time slot if the message indicates a quantity of zero slots associated with the time offset between the third set of resources and the second set of resources. In some implementations, the communications manager 620 may be configured as or otherwise support a means for receiving HARQ-ACK feedback for the at least one MAC-CE via a fourth set of resources associated with the first cell.

In some implementations, to support receiving the AP-CSI report, the communications manager 620 may be configured as or otherwise support a means for receiving the AP-CSI report via a set of PUSCH resources in accordance with a time offset between the set of PUSCH resources and the fourth set of resources, where the at least one MAC-CE that triggers the AP-CSI reporting indicates the set of PUSCH resources and the time offset between the set of PUSCH resources and the fourth set of resources.

In some implementations, to support receiving the AP-CSI report, the communications manager 620 may be configured as or otherwise support a means for receiving the AP-CSI report via a set of PUSCH resources in accordance with a time offset between the set of PUSCH resources and the second set of resources, where the at least one MAC-CE that triggers the AP-CSI reporting indicates the set of PUSCH resources and the time offset between the set of PUSCH resources and the second set of resources.

In some implementations, to support transmitting the one or more aperiodic reference signals, the communications manager 620 may be configured as or otherwise support a means for transmitting at least one aperiodic CSI-RS via at least one aperiodic CMR or aperiodic IMR associated with the second cell.

In some implementations, the communications manager 620 may be configured as or otherwise support a means for transmitting downlink scheduling information associated with the second cell in accordance with the AP-CSI report. In some implementations, the communications manager 620 may be configured as or otherwise support a means for transmitting, via the second cell, at least one downlink message in accordance with the downlink scheduling information.

In some implementations, to support receiving the AP-CSI report, the communications manager 620 may be configured as or otherwise support a means for receiving the AP-CSI report via a set of PUSCH resources associated with at least one of the first cell, the second cell, or a third cell.

In some implementations, the communications manager 620 may be configured to perform various operations (such as receiving, obtaining, monitoring, outputting, transmitting) using or otherwise in cooperation with the transceiver 610, the one or more antennas 615 (such as where applicable), or any combination thereof. Although the communications manager 620 is illustrated as a separate component, in some implementations, one or more functions described with reference to the communications manager 620 may be supported by or performed by the transceiver 610, the processor 635, the memory 625, the code 630, or any combination thereof. For example, the code 630 may include instructions executable by the processor 635 to cause the device 605 to perform various aspects of CSI reporting techniques for SCell activation as described herein, or the processor 635 and the memory 625 may be otherwise configured to perform or support such operations.

Figure 7:
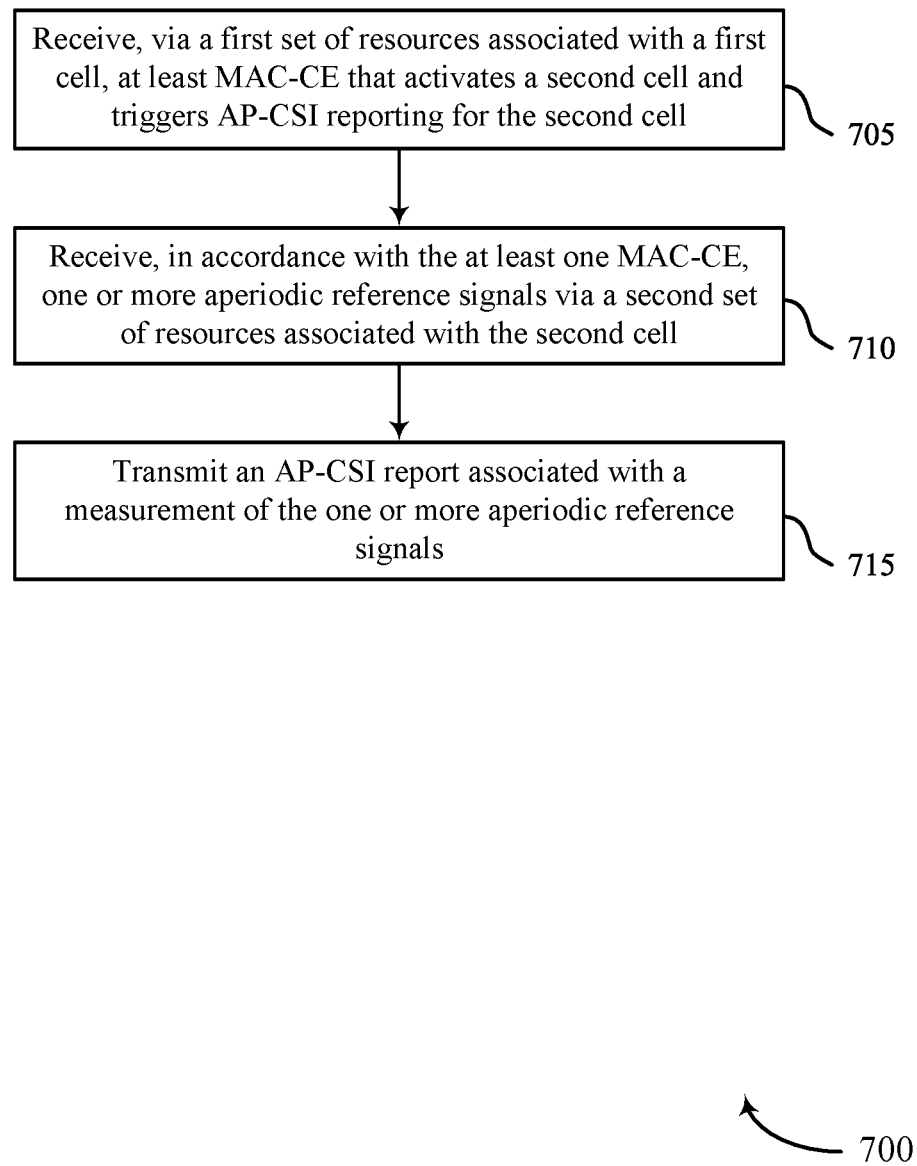
FIGS. 7 and 8 show flowcharts illustrating example methods that support CSI reporting techniques for SCell activation.

FIG. 7 shows a flowchart illustrating an example method 700 that supports CSI reporting techniques for SCell activation. The operations of the method 700 may be implemented by a UE or components thereof. For example, the operations of the method 700 may be performed by a UE 115, as described with reference to FIGS. 1-5. In some implementations, a UE may execute a set of instructions to control the functional elements of the UE to perform the described functions. Additionally, or alternatively, the UE may perform aspects of the described functions using special-purpose hardware.

At 705, the UE may receive, via a first set of resources associated with a first cell, at least one MAC-CE that activates a second cell and triggers AP-CSI reporting for the second cell. The operations of 705 may be performed in accordance with examples as disclosed herein.

At 710, the UE may receive, in accordance with the at least one MAC-CE, one or more aperiodic reference signals via a second set of resources associated with the second cell. The operations of 710 may be performed in accordance with examples as disclosed herein.

At 715, the UE may transmit an AP-CSI report associated with a measurement of the one or more aperiodic reference signals. The operations of 715 may be performed in accordance with examples as disclosed herein.

Figure 8:
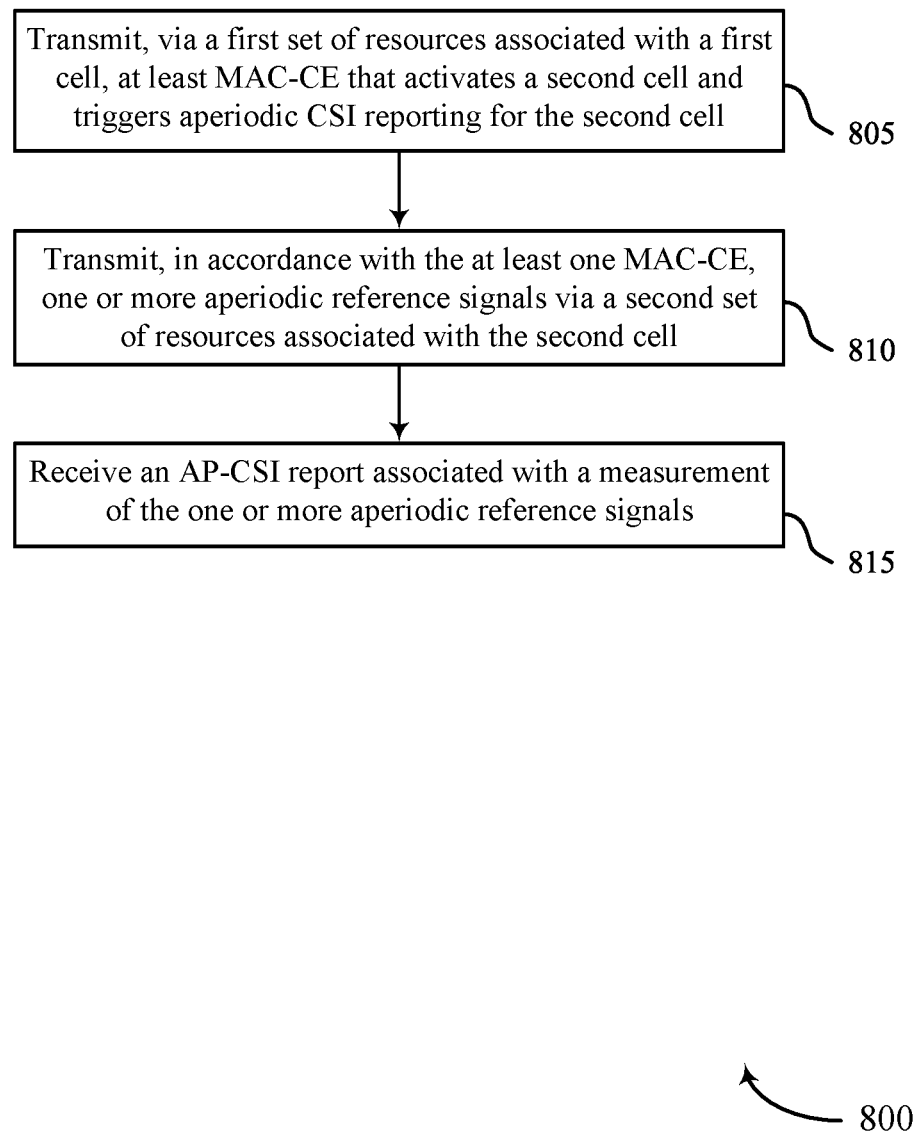

FIG. 8 shows a flowchart illustrating an example method 800 that supports CSI reporting techniques for SCell activation. The operations of the method 800 may be implemented by a network entity or components thereof. For example, the operations of the method 800 may be performed by a network entity 105, as described with reference to FIGS. 1-4 and 6. In some implementations, a network entity may execute a set of instructions to control the functional elements of the network entity to perform the described functions. Additionally, or alternatively, the network entity may perform aspects of the described functions using special-purpose hardware.

At 805, the network entity may transmit, via a first set of resources associated with a first cell, at least one MAC-CE that activates a second cell and triggers AP-CSI reporting for the second cell. The operations of 805 may be performed in accordance with examples as disclosed herein.

At 810, the network entity may transmit, in accordance with the at least one MAC-CE, one or more aperiodic reference signals via a second set of resources associated with the second cell. The operations of 810 may be performed in accordance with examples as disclosed herein.

At 815, the network entity may receive an AP-CSI report associated with a measurement of the one or more aperiodic reference signals. The operations of 815 may be performed in accordance with examples as disclosed herein.

Implementation examples are described in the following numbered clauses:

Clause 1: A method for wireless communication at a UE, including: receiving, via a first set of resources associated with a first cell, at least one MAC-CE that activates a second cell and triggers aperiodic CSI reporting for the second cell; receiving, in accordance with the at least one MAC-CE, one or more aperiodic reference signals via a second set of resources associated with the second cell; and transmitting an aperiodic CSI report associated with a measurement of the one or more aperiodic reference signals.

Clause 2: The method of clause 1, where receiving the at least one MAC-CE includes: receiving, via the at least one MAC-CE in accordance with the at least one MAC-CE activating the second cell, a first indication to trigger aperiodic TRS measurements for the second cell and a second indication to trigger the aperiodic CSI reporting for the second cell, where the at least one MAC-CE is a single MAC-CE, and where receiving the one or more aperiodic reference signals via the second set of resources is in accordance with the second indication.

Clause 3: The method of any of clauses 1 through 2, where receiving the at least one MAC-CE includes: receiving a first MAC-CE that activates the second cell and triggers aperiodic TRS measurements for the second cell; and receiving a second MAC-CE that triggers the aperiodic CSI reporting for the second cell, where receiving the one or more aperiodic reference signals is in accordance with the second MAC-CE.

Clause 4: The method of any of clauses 1 through 3, further including: receiving an indication of multiple aperiodic CMRs and multiple aperiodic IMRs associated with the second cell via control signaling, where the multiple aperiodic CMRs and the multiple aperiodic IMRs include the second set of resources.

Clause 5: The method of clause 4, where the indication of the multiple aperiodic CMRs and the multiple aperiodic IMRs indicates that the multiple aperiodic CMRs and the multiple aperiodic IMRs are exclusively associated with the aperiodic CSI reporting triggered by the at least one MAC-CE that activates the second cell.

Clause 6: The method of any of clauses 4 through 5, where the at least one MAC-CE indicates the second set of resources from the multiple aperiodic CMRs and the multiple aperiodic IMRs, the second set of resources includes an aperiodic CMR from the multiple aperiodic CMRs and an aperiodic IMR from the multiple aperiodic IMRs.

Clause 7: The method of any of clauses 1 through 6, further including: receiving at least one aperiodic TRS via a third set of resources associated with the second cell, where the at least one MAC-CE further triggers the at least one aperiodic TRS, and where the at least one MAC-CE that triggers the aperiodic CSI reporting indicates a time offset between the third set of resources and the second set of resources.

Clause 8: The method of clause 7, further including: transmitting a message that indicates a quantity of slots associated with the time offset between the third set of resources and the second set of resources, where the quantity of slots is associated with a threshold duration of the time offset between the third set of resources and the second set of resources and is associated with a capability of the UE to acquire downlink synchronization using the at least one aperiodic TRS, and where the second set of resources are scheduled according to a downlink resource availability of a network entity.

Clause 9: The method of clause 8, where the second set of resources and the third set of resources are scheduled in a same time slot if the message indicates a quantity of zero slots associated with the time offset between the third set of resources and the second set of resources.

Clause 10: The method of any of clauses 1 through 9, further including: transmitting HARQ-ACK feedback for the at least one MAC-CE via a fourth set of resources associated with the first cell.

Clause 11: The method of clause 10, where transmitting the aperiodic CSI report includes: transmitting the aperiodic CSI report via a set of PUSCH resources in accordance with a time offset between the set of PUSCH resources and the fourth set of resources, where the at least one MAC-CE that triggers the aperiodic CSI reporting indicates the set of PUSCH resources and the time offset between the set of PUSCH resources and the fourth set of resources.

Clause 12: The method of any of clauses 1 through 11, where transmitting the aperiodic CSI report includes: transmitting the aperiodic CSI report via a set of PUSCH resources in accordance with a time offset between the set of PUSCH resources and the second set of resources, where the at least one MAC-CE that triggers the aperiodic CSI reporting indicates the set of PUSCH resources and the time offset between the set of PUSCH resources and the second set of resources.

Clause 13: The method of any of clauses 1 through 12, where receiving the one or more aperiodic reference signals via the second set of resources includes: measuring CSI via at least one aperiodic CMR or IMR associated with the second cell.

Clause 14: The method of any of clauses 1 through 13, further including: receiving downlink scheduling information associated with the second cell in accordance with the aperiodic CSI report from the UE; and receiving, via the second cell, at least one downlink message in accordance with the downlink scheduling information.

Clause 15: The method of any of clauses 1 through 14, where transmitting the aperiodic CSI report includes: transmitting the aperiodic CSI report via a set of PUSCH resources associated with at least one of the first cell, the second cell, or a third cell that is activated for the UE.

Clause 16: A method for wireless communication at a network entity, including: transmitting, via a first set of resources associated with a first cell, at least one MAC-CE that activates a second cell and triggers aperiodic CSI reporting for the second cell; transmitting, in accordance with the at least one MAC-CE, one or more aperiodic reference signals via a second set of resources associated with the second cell; and receiving an aperiodic CSI report associated with a measurement of the one or more aperiodic reference signals.

Clause 17: The method of clause 16, where transmitting the at least one MAC-CE includes: transmitting, via the at least one MAC-CE in accordance with the at least one MAC-CE activating the second cell, a first indication to trigger aperiodic TRS measurements for the second cell and a second indication to trigger the aperiodic CSI reporting for the second cell, where the at least one MAC-CE is a single MAC-CE, and where transmitting the one or more aperiodic reference signals via the second set of resources is in accordance with the second indication.

Clause 18: The method of any of clauses 16 through 17, where transmitting the at least one MAC-CE includes: transmitting a first MAC-CE that activates the second cell and triggers aperiodic TRS measurements for the second cell; and transmitting a second MAC-CE that triggers the aperiodic CSI reporting for the second cell, where transmitting the one or more aperiodic reference signals is in accordance with the second MAC-CE.

Clause 19: The method of any of clauses 16 through 18, further including: transmitting an indication of multiple aperiodic CMRs and multiple aperiodic IMRs associated with the second cell via control signaling, where the multiple aperiodic CMRs and the multiple aperiodic IMRs include the second set of resources.

Clause 20: The method of clause 19, where the indication of the multiple aperiodic CMRs and the multiple aperiodic IMRs indicates that the multiple aperiodic CMRs and the multiple aperiodic IMRs are exclusively associated with the aperiodic CSI reporting triggered by the at least one MAC-CE that activates the second cell.

Clause 21: The method of any of clauses 19 through 20, where the at least one MAC-CE indicates the second set of resources from the multiple aperiodic CMRs and the multiple aperiodic IMRs, the second set of resources includes an aperiodic CMR from the multiple aperiodic CMRs and an aperiodic IMR from the multiple aperiodic IMRs.

Clause 22: The method of any of clauses 16 through 21, further including: transmitting at least one aperiodic TRS via a third set of resources associated with the second cell, where the at least one MAC-CE further triggers the at least one aperiodic TRS, and where the at least one MAC-CE that triggers the aperiodic CSI reporting indicates a time offset between the third set of resources and the second set of resources.

Clause 23: The method of clause 22, further including: receiving a message that indicates a quantity of slots associated with the time offset between the third set of resources and the second set of resources, where the quantity of slots is associated with a threshold duration of the time offset between the third set of resources and the second set of resources and is associated with a capability of a UE to acquire downlink synchronization using the at least one aperiodic TRS, and where the second set of resources are scheduled according to a downlink resource availability of the network entity.

Clause 24: The method of clause 23, where the second set of resources and the third set of resources are scheduled in a same time slot if the message indicates a quantity of zero slots associated with the time offset between the third set of resources and the second set of resources.

Clause 25: The method of any of clauses 16 through 24, further including: receiving HARQ-ACK feedback for the at least one MAC-CE via a fourth set of resources associated with the first cell.

Clause 26: The method of clause 25, where receiving the aperiodic CSI report includes: receiving the aperiodic CSI report via a set of PUSCH resources in accordance with a time offset between the set of PUSCH resources and the fourth set of resources, where the at least one MAC-CE that triggers the aperiodic CSI reporting indicates the set of PUSCH resources and the time offset between the set of PUSCH resources and the fourth set of resources.

Clause 27: The method of any of clauses 16 through 26, where receiving the aperiodic CSI report includes: receiving the aperiodic CSI report via a set of PUSCH resources in accordance with a time offset between the set of PUSCH resources and the second set of resources, where the at least one MAC-CE that triggers the aperiodic CSI reporting indicates the set of PUSCH resources and the time offset between the set of PUSCH resources and the second set of resources.

Clause 28: The method of any of clauses 16 through 27, where transmitting the one or more aperiodic reference signals includes: transmitting at least one aperiodic CSI-RS via at least one aperiodic CMR or IMR associated with the second cell.

Clause 29: The method of any of clauses 16 through 28, further including: transmitting downlink scheduling information associated with the second cell in accordance with the aperiodic CSI report; and transmitting, via the second cell, at least one downlink message in accordance with the downlink scheduling information.

Clause 30: The method of any of clauses 16 through 29, where receiving the aperiodic CSI report includes: receiving the aperiodic CSI report via a set of PUSCH resources associated with at least one of the first cell, the second cell, or a third cell.

Clause 31: An apparatus for wireless communication at a UE, including: one or more interfaces configured to: obtain, via a first set of resources associated with a first cell, at least one MAC-CE that activates a second cell and triggers aperiodic CSI reporting for the second cell; obtain, in accordance with the at least one MAC-CE, one or more aperiodic reference signals via a second set of resources associated with the second cell; and output an aperiodic CSI report associated with a measurement of the one or more aperiodic reference signals.

Clause 32: The apparatus of clause 31, where, to obtain the at least one MAC-CE, the one or more interfaces are configured to: obtain, via the at least one MAC-CE in accordance with the at least one MAC-CE activating the second cell, a first indication to trigger aperiodic TRS measurements for the second cell and a second indication to trigger the aperiodic CSI reporting for the second cell, where the at least one MAC-CE is a single MAC-CE, and where obtaining the one or more aperiodic reference signals via the second set of resources is in accordance with the second indication.

Clause 33: The apparatus of any of clauses 31 through 32, where, to obtain the at least one MAC-CE, the one or more interfaces are configured to: obtain a first MAC-CE that activates the second cell and triggers aperiodic TRS measurements for the second cell; and obtain a second MAC-CE that triggers the aperiodic CSI reporting for the second cell, where obtaining the one or more aperiodic reference signals is in accordance with the second MAC-CE.

Clause 34: The apparatus of any of clauses 31 through 33, where the one or more interfaces are further configured to: obtain an indication of multiple aperiodic CMRs and multiple aperiodic IMRs associated with the second cell via control signaling, where the multiple aperiodic CMRs and the multiple aperiodic IMRs include the second set of resources.

Clause 35: The apparatus of clause 34, where the indication of the multiple aperiodic CMRs and the multiple aperiodic IMRs indicates that the multiple aperiodic CMRs and the multiple aperiodic IMRs are exclusively associated with the aperiodic CSI reporting triggered by the at least one MAC-CE that activates the second cell.

Clause 36: The apparatus of any of clauses 34 through 35, where the at least one MAC-CE indicates the second set of resources from the multiple aperiodic CMRs and the multiple aperiodic IMRs, and the second set of resources includes an aperiodic CMR from the multiple aperiodic CMRs and an aperiodic IMR from the multiple aperiodic IMRs.

Clause 37: The apparatus of any of clauses 31 through 36, where the one or more interfaces are further configured to: obtain at least one aperiodic TRS via a third set of resources associated with the second cell, where the at least one MAC-CE further triggers the at least one aperiodic TRS, and where the at least one MAC-CE that triggers the aperiodic CSI reporting indicates a time offset between the third set of resources and the second set of resources.

Clause 38: The apparatus of clause 37, where the one or more interfaces are further configured to: output a message that indicates a quantity of slots associated with the time offset between the third set of resources and the second set of resources, where the quantity of slots is associated with a threshold duration of the time offset between the third set of resources and the second set of resources and is associated with a capability of the apparatus to acquire downlink synchronization using the at least one aperiodic TRS, and where the second set of resources are scheduled according to a downlink resource availability of a network entity.

Clause 39: The apparatus of clause 38, where the second set of resources and the third set of resources are scheduled in a same time slot if the message indicates a quantity of zero slots associated with the time offset between the third set of resources and the second set of resources.

Clause 40: The apparatus of any of clauses 31 through 39, where the one or more interfaces are further configured to: output HARQ-ACK feedback for the at least one MAC-CE via a fourth set of resources associated with the first cell.

Clause 41: The apparatus of clause 40, where, to output the aperiodic CSI report, the one or more interfaces are configured to: output the aperiodic CSI report via a set of PUSCH resources in accordance with a time offset between the set of PUSCH resources and the fourth set of resources, where the at least one MAC-CE that triggers the aperiodic CSI reporting indicates the set of PUSCH resources and the time offset between the set of PUSCH resources and the fourth set of resources.

Clause 42: The apparatus of any of clauses 31 through 41, where, to output the aperiodic CSI report, the one or more interfaces are configured to: output the aperiodic CSI report via a set of PUSCH resources in accordance with a time offset between the set of PUSCH resources and the second set of resources, where the at least one MAC-CE that triggers the aperiodic CSI reporting indicates the set of PUSCH resources and the time offset between the set of PUSCH resources and the second set of resources.

Clause 43: The apparatus of any of clauses 31 through 42, where, to obtain the one or more aperiodic reference signals via the second set of resources, the one or more interfaces are configured to: measure CSI via at least one aperiodic CMR or IMR associated with the second cell.

Clause 44: The apparatus of any of clauses 31 through 43, where the one or more interfaces are further configured to: obtain downlink scheduling information associated with the second cell in accordance with the aperiodic CSI report from the apparatus; and obtain, via the second cell, at least one downlink message in accordance with the downlink scheduling information.

Clause 45: The apparatus of any of clauses 31 through 44, where, to output the aperiodic CSI report, the one or more interfaces are configured to: output the aperiodic CSI report via a set of PUSCH resources associated with at least one of the first cell, the second cell, or a third cell that is activated for the apparatus.

Clause 46: The apparatus of any of clauses 31 through 45, further including: a processing system configured to and capable of performing one or more functions or operations of the apparatus.

Clause 47: An apparatus for wireless communication at a network entity, including: one or more interfaces configured to: output, via a first set of resources associated with a first cell, at least one MAC-CE that activates a second cell and triggers aperiodic CSI reporting for the second cell; output, in accordance with the at least one MAC-CE, one or more aperiodic reference signals via a second set of resources associated with the second cell; and obtain an aperiodic CSI report associated with a measurement of the one or more aperiodic reference signals.

Clause 48: The apparatus of clause 47, where, to output the at least one MAC-CE, the one or more interfaces are configured to: output, via the at least one MAC-CE in accordance with the at least one MAC-CE activating the second cell, a first indication to trigger aperiodic TRS measurements for the second cell and a second indication to trigger the aperiodic CSI reporting for the second cell, where the at least one MAC-CE is a single MAC-CE, and where outputting the one or more aperiodic reference signals via the second set of resources is in accordance with the second indication.

Clause 49: The apparatus of any of clauses 47 through 48, where, to output the at least one MAC-CE, the one or more interfaces are configured to: output a first MAC-CE that activates the second cell and triggers aperiodic TRS measurements for the second cell; and output a second MAC-CE that triggers the aperiodic CSI reporting for the second cell, where outputting the one or more aperiodic reference signals is in accordance with the second MAC-CE.

Clause 50: The apparatus of any of clauses 47 through 49, where the one or more interfaces are further configured to: output an indication of multiple aperiodic CMRs and multiple aperiodic IMRs associated with the second cell via control signaling, where the multiple aperiodic CMRs and the multiple aperiodic IMRs include the second set of resources.

Clause 51: The apparatus of clause 50, where the indication of the multiple aperiodic CMRs and the multiple aperiodic IMRs indicates that the multiple aperiodic CMRs and the multiple aperiodic IMRs are exclusively associated with the aperiodic CSI reporting triggered by the at least one MAC-CE that activates the second cell.

Clause 52: The apparatus of any of clauses 50 through 51, where the at least one MAC-CE indicates the second set of resources from the multiple aperiodic CMRs and the multiple aperiodic IMRs, and the second set of resources includes an aperiodic CMR from the multiple aperiodic CMRs and an aperiodic IMR from the multiple aperiodic IMRs.

Clause 53: The apparatus of any of clauses 47 through 52, where the one or more interfaces are further configured to: output at least one aperiodic TRS via a third set of resources associated with the second cell, where the at least one MAC-CE further triggers the at least one aperiodic TRS, and where the at least one MAC-CE that triggers the aperiodic CSI reporting indicates a time offset between the third set of resources and the second set of resources.

Clause 54: The apparatus of clause 53, where the one or more interfaces are further configured to: obtain a message that indicates a quantity of slots associated with the time offset between the third set of resources and the second set of resources, where the quantity of slots is associated with a threshold duration of the time offset between the third set of resources and the second set of resources and is associated with a capability of a UE to acquire downlink synchronization using the at least one aperiodic TRS, and where the second set of resources are scheduled according to a downlink resource availability of the apparatus.

Clause 55: The apparatus of clause 54, where the second set of resources and the third set of resources are scheduled in a same time slot if the message indicates a quantity of zero slots associated with the time offset between the third set of resources and the second set of resources.

Clause 56: The apparatus of any of clauses 47 through 55, where the one or more interfaces are further configured to: obtain HARQ-ACK feedback for the at least one MAC-CE via a fourth set of resources associated with the first cell.

Clause 57: The apparatus of clause 56, where, to obtain the aperiodic CSI report, the one or more interfaces are configured to: obtain the aperiodic CSI report via a set of PUSCH resources in accordance with a time offset between the set of PUSCH resources and the fourth set of resources, where the at least one MAC-CE that triggers the aperiodic CSI reporting indicates the set of PUSCH resources and the time offset between the set of PUSCH resources and the fourth set of resources.

Clause 58: The apparatus of any of clauses 47 through 57, where, to obtain the aperiodic CSI report, the one or more interfaces are configured to: obtain the aperiodic CSI report via a set of PUSCH resources in accordance with a time offset between the set of PUSCH resources and the second set of resources, where the at least one MAC-CE that triggers the aperiodic CSI reporting indicates the set of PUSCH resources and the time offset between the set of PUSCH resources and the second set of resources.

Clause 59: The apparatus of any of clauses 47 through 58, where, to output the one or more aperiodic reference signals, the one or more interfaces are configured to: output at least one aperiodic CSI-RS via at least one aperiodic CMR or IMR associated with the second cell.

Clause 60: The apparatus of any of clauses 47 through 59, where the one or more interfaces are further configured to: output downlink scheduling information associated with the second cell in accordance with the aperiodic CSI report; and output, via the second cell, at least one downlink message in accordance with the downlink scheduling information.

Clause 61: The apparatus of any of clauses 47 through 60, where, to obtain the aperiodic CSI report, the one or more interfaces are configured to: obtain the aperiodic CSI report via a set of PUSCH resources associated with at least one of the first cell, the second cell, or a third cell.

Clause 62: The apparatus of any of clauses 47 through 61, further including: a processing system configured to and capable of performing one or more functions or operations of the apparatus.

Clause 63: An apparatus for wireless communication at a UE, including: means for receiving, via a first set of resources associated with a first cell, at least one MAC-CE that activates a second cell and triggers aperiodic CSI reporting for the second cell; means for receiving, in accordance with the at least one MAC-CE, one or more aperiodic reference signals via a second set of resources associated with the second cell; and means for transmitting an aperiodic CSI report associated with a measurement of the one or more aperiodic reference signals.

Clause 64: The apparatus of clause 63, where the means for receiving the at least one MAC-CE include: means for receiving, via the at least one MAC-CE in accordance with the at least one MAC-CE activating the second cell, a first indication to trigger aperiodic TRS measurements for the second cell and a second indication to trigger the aperiodic CSI reporting for the second cell, where the at least one MAC-CE is a single MAC-CE, and where receiving the one or more aperiodic reference signals via the second set of resources is in accordance with the second indication.

Clause 65: The apparatus of any of clauses 63 through 64, where the means for receiving the at least one MAC-CE include: means for receiving a first MAC-CE that activates the second cell and triggers aperiodic TRS measurements for the second cell; and means for receiving a second MAC-CE that triggers the aperiodic CSI reporting for the second cell, where receiving the one or more aperiodic reference signals is in accordance with the second MAC-CE.

Clause 66: The apparatus of any of clauses 63 through 65, further including: means for receiving an indication of multiple aperiodic CMRs and multiple aperiodic IMRs associated with the second cell via control signaling, where the multiple aperiodic CMRs and the multiple aperiodic IMRs include the second set of resources.

Clause 67: The apparatus of clause 66, where the indication of the multiple aperiodic CMRs and the multiple aperiodic IMRs indicates that the multiple aperiodic CMRs and the multiple aperiodic IMRs are exclusively associated with the aperiodic CSI reporting triggered by the at least one MAC-CE that activates the second cell.

Clause 68: The apparatus of any of clauses 66 through 67, where the at least one MAC-CE indicates the second set of resources from the multiple aperiodic CMRs and the multiple aperiodic IMRs, the second set of resources includes an aperiodic CMR from the multiple aperiodic CMRs and an aperiodic IMR from the multiple aperiodic IMRs.

Clause 69: The apparatus of any of clauses 63 through 68, further including: means for receiving at least one aperiodic TRS via a third set of resources associated with the second cell, where the at least one MAC-CE further triggers the at least one aperiodic TRS, and where the at least one MAC-CE that triggers the aperiodic CSI reporting indicates a time offset between the third set of resources and the second set of resources.

Clause 70: The apparatus of clause 69, further including: means for transmitting a message that indicates a quantity of slots associated with the time offset between the third set of resources and the second set of resources, where the quantity of slots is associated with a threshold duration of the time offset between the third set of resources and the second set of resources and is associated with a capability of the UE to acquire downlink synchronization using the at least one aperiodic TRS, and where the second set of resources are scheduled according to a downlink resource availability of a network entity.

Clause 71: The apparatus of clause 70, where the second set of resources and the third set of resources are scheduled in a same time slot if the message indicates a quantity of zero slots associated with the time offset between the third set of resources and the second set of resources.

Clause 72: The apparatus of any of clauses 63 through 71, further including: means for transmitting HARQ-ACK feedback for the at least one MAC-CE via a fourth set of resources associated with the first cell.

Clause 73: The apparatus of clause 72, where the means for transmitting the aperiodic CSI report include: means for transmitting the aperiodic CSI report via a set of PUSCH resources in accordance with a time offset between the set of PUSCH resources and the fourth set of resources, where the at least one MAC-CE that triggers the aperiodic CSI reporting indicates the set of PUSCH resources and the time offset between the set of PUSCH resources and the fourth set of resources.

Clause 74: The apparatus of any of clauses 63 through 73, where the means for transmitting the aperiodic CSI report include: means for transmitting the aperiodic CSI report via a set of PUSCH resources in accordance with a time offset between the set of PUSCH resources and the second set of resources, where the at least one MAC-CE that triggers the aperiodic CSI reporting indicates the set of PUSCH resources and the time offset between the set of PUSCH resources and the second set of resources.

Clause 75: The apparatus of any of clauses 63 through 74, where the means for receiving the one or more aperiodic reference signals via the second set of resources include: means for measuring CSI via at least one aperiodic CMR or IMR associated with the second cell.

Clause 76: The apparatus of any of clauses 63 through 75, further including: means for receiving downlink scheduling information associated with the second cell in accordance with the aperiodic CSI report from the UE; and means for receiving, via the second cell, at least one downlink message in accordance with the downlink scheduling information.

Clause 77: The apparatus of any of clauses 63 through 76, where the means for transmitting the aperiodic CSI report include: means for transmitting the aperiodic CSI report via a set of PUSCH resources associated with at least one of the first cell, the second cell, or a third cell that is activated for the UE.

Clause 78: An apparatus for wireless communication at a network entity, including: means for transmitting, via a first set of resources associated with a first cell, at least one MAC-CE that activates a second cell and triggers aperiodic CSI reporting for the second cell; means for transmitting, in accordance with the at least one MAC-CE, one or more aperiodic reference signals via a second set of resources associated with the second cell; and means for receiving an aperiodic CSI report associated with a measurement of the one or more aperiodic reference signals.

Clause 79: The apparatus of clause 78, where the means for transmitting the at least one MAC-CE include: means for transmitting, via the at least one MAC-CE in accordance with the at least one MAC-CE activating the second cell, a first indication to trigger aperiodic TRS measurements for the second cell and a second indication to trigger the aperiodic CSI reporting for the second cell, where the at least one MAC-CE is a single MAC-CE, and where transmitting the one or more aperiodic reference signals via the second set of resources is in accordance with the second indication.

Clause 80: The apparatus of any of clauses 78 through 79, where the means for transmitting the at least one MAC-CE include: means for transmitting a first MAC-CE that activates the second cell and triggers aperiodic TRS measurements for the second cell; and means for transmitting a second MAC-CE that triggers the aperiodic CSI reporting for the second cell, where transmitting the one or more aperiodic reference signals is in accordance with the second MAC-CE.

Clause 81: The apparatus of any of clauses 78 through 80, further including: means for transmitting an indication of multiple aperiodic CMRs and multiple aperiodic IMRs associated with the second cell via control signaling, where the multiple aperiodic CMRs and the multiple aperiodic IMRs include the second set of resources.

Clause 82: The apparatus of clause 81, where the indication of the multiple aperiodic CMRs and the multiple aperiodic IMRs indicates that the multiple aperiodic CMRs and the multiple aperiodic IMRs are exclusively associated with the aperiodic CSI reporting triggered by the at least one MAC-CE that activates the second cell.

Clause 83: The apparatus of any of clauses 81 through 82, where the at least one MAC-CE indicates the second set of resources from the multiple aperiodic CMRs and the multiple aperiodic IMRs, the second set of resources includes an aperiodic CMR from the multiple aperiodic CMRs and an aperiodic IMR from the multiple aperiodic IMRs.

Clause 84: The apparatus of any of clauses 78 through 83, further including: means for transmitting at least one aperiodic TRS via a third set of resources associated with the second cell, where the at least one MAC-CE further triggers the at least one aperiodic TRS, and where the at least one MAC-CE that triggers the aperiodic CSI reporting indicates a time offset between the third set of resources and the second set of resources.

Clause 85: The apparatus of clause 84, further including: means for receiving a message that indicates a quantity of slots associated with the time offset between the third set of resources and the second set of resources, where the quantity of slots is associated with a threshold duration of the time offset between the third set of resources and the second set of resources and is associated with a capability of a UE to acquire downlink synchronization using the at least one aperiodic TRS, and where the second set of resources are scheduled according to a downlink resource availability of the network entity.

Clause 86: The apparatus of clause 85, where the second set of resources and the third set of resources are scheduled in a same time slot if the message indicates a quantity of zero slots associated with the time offset between the third set of resources and the second set of resources.

Clause 87: The apparatus of any of clauses 78 through 86, further including: means for receiving HARQ-ACK feedback for the at least one MAC-CE via a fourth set of resources associated with the first cell.

Clause 88: The apparatus of clause 87, where the means for receiving the aperiodic CSI report include: means for receiving the aperiodic CSI report via a set of PUSCH resources in accordance with a time offset between the set of PUSCH resources and the fourth set of resources, where the at least one MAC-CE that triggers the aperiodic CSI reporting indicates the set of PUSCH resources and the time offset between the set of PUSCH resources and the fourth set of resources.

Clause 89: The apparatus of any of clauses 78 through 88, where the means for receiving the aperiodic CSI report include: means for receiving the aperiodic CSI report via a set of PUSCH resources in accordance with a time offset between the set of PUSCH resources and the second set of resources, where the at least one MAC-CE that triggers the aperiodic CSI reporting indicates the set of PUSCH resources and the time offset between the set of PUSCH resources and the second set of resources.

Clause 90: The apparatus of any of clauses 78 through 89, where the means for transmitting the one or more aperiodic reference signals include: means for transmitting at least one aperiodic CSI-RS via at least one aperiodic CMR or IMR associated with the second cell.

Clause 91: The apparatus of any of clauses 78 through 90, further including: means for transmitting downlink scheduling information associated with the second cell in accordance with the aperiodic CSI report; and means for transmitting, via the second cell, at least one downlink message in accordance with the downlink scheduling information.

Clause 92: The apparatus of any of clauses 78 through 91, where the means for receiving the aperiodic CSI report include: means for receiving the aperiodic CSI report via a set of PUSCH resources associated with at least one of the first cell, the second cell, or a third cell.

Clause 93: A non-transitory computer-readable medium storing code for wireless communication at a UE, the code including instructions executable by a processor to: receive, via a first set of resources associated with a first cell, at least one MAC-CE that activates a second cell and triggers aperiodic CSI reporting for the second cell; receive, in accordance with the at least one MAC-CE, one or more aperiodic reference signals via a second set of resources associated with the second cell; and transmit an aperiodic CSI report associated with a measurement of the one or more aperiodic reference signals.

Clause 94: A non-transitory computer-readable medium storing code for wireless communication at a network entity, the code including instructions executable by a processor to: transmit, via a first set of resources associated with a first cell, at least one MAC-CE that activates a second cell and triggers aperiodic CSI reporting for the second cell; transmit, in accordance with the at least one MAC-CE, one or more aperiodic reference signals via a second set of resources associated with the second cell; and receive an aperiodic CSI report associated with a measurement of the one or more aperiodic reference signals.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and one or more microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in some combinations and even initially claimed as such, one or more features from a claimed combination can be excised from the combination, and the claimed combination may be directed to a sub-combination or variation of a sub-combination.

Similarly, while operations are depicted in the drawings in a particular order, this is not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above is not to be understood as requiring such separation in all implementations, and it is to be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A user equipment (UE), comprising:
   a processing system that includes one or more processors and one or more code-storing memories coupled with the one or more processors, the processing system configured to cause the UE to:
   obtain, via a first set of resources associated with a first cell, at least one medium access control (MAC)-control element (CE) that activates a second cell and triggers aperiodic channel state information (CSI) reporting for the second cell;
   obtain, in accordance with the at least one MAC-CE, one or more aperiodic reference signals via a second set of resources associated with the second cell; and
   output an aperiodic CSI report associated with a measurement of the one or more aperiodic reference signals.

2. The UE of claim 1, wherein, to obtain the at least one MAC-CE, the processing system is further configured to:
   obtain, via the at least one MAC-CE in accordance with the at least one MAC-CE activating the second cell, a first indication to trigger aperiodic tracking reference signal (TRS) measurements for the second cell and a second indication to trigger the aperiodic CSI reporting for the second cell, wherein the at least one MAC-CE is a single MAC-CE, and wherein obtaining the one or more aperiodic reference signals via the second set of resources is in accordance with the second indication.

3. The UE apparatus of claim 1, wherein, to obtain the at least one MAC-CE, the processing system is further configured to:

obtain a first MAC-CE that activates the second cell and triggers aperiodic tracking reference signal (TRS) measurements for the second cell; and obtain a second MAC-CE that triggers the aperiodic CSI reporting for the second cell, wherein obtaining the one or more aperiodic reference signals is in accordance with the second MAC-CE.

4. The UE of claim 1, wherein the processing system is further configured to:

obtain an indication of a plurality of aperiodic channel measurement resources (CMRs) and a plurality of aperiodic interference measurement resources (IMRs) associated with the second cell via control signaling, wherein the plurality of aperiodic CMRs and the plurality of aperiodic IMRs comprise the second set of resources.

5. The UE of claim 4, wherein the indication of the plurality of aperiodic CMRs and the plurality of aperiodic IMRs indicates that the plurality of aperiodic CMRs and the plurality of aperiodic IMRs are exclusively associated with the aperiodic CSI reporting triggered by the at least one MAC-CE that activates the second cell.

6. The UE of claim 4, wherein the at least one MAC-CE indicates the second set of resources from the plurality of aperiodic CMRs and the plurality of aperiodic IMRs, and wherein the second set of resources comprises an aperiodic CMR from the plurality of aperiodic CMRs and an aperiodic IMR from the plurality of aperiodic IMRs.

7. The UE of claim 1, wherein the processing system is further configured to:

obtain at least one aperiodic tracking reference signal (TRS) via a third set of resources associated with the second cell, wherein the at least one MAC-CE further triggers the at least one aperiodic TRS, and wherein the at least one MAC-CE that triggers the aperiodic CSI reporting indicates a time offset between the third set of resources and the second set of resources.

8. The UE of claim 7, wherein the processing system is further configured to:

output a message that indicates a quantity of slots associated with the time offset between the third set of resources and the second set of resources, wherein the quantity of slots is associated with a threshold duration of the time offset between the third set of resources and the second set of resources and is associated with a capability of the apparatus to acquire downlink synchronization using the at least one aperiodic TRS, and wherein the second set of resources are scheduled according to a downlink resource availability of a network entity.

9. The UE of claim 8, wherein the second set of resources and the third set of resources are scheduled in a same time slot if the message indicates a quantity of zero slots associated with the time offset between the third set of resources and the second set of resources.

10. The UE of claim 1, wherein the processing system is further configured to output hybrid automatic repeat request (HARQ)-acknowledgement (ACK) feedback for the at least one MAC-CE via a fourth set of resources associated with the first cell.

11. The UE of claim 10, wherein, to output the aperiodic CSI report, the processing system is further configured to:

output the aperiodic CSI report via a set of physical uplink shared channel (PUSCH) resources in accordance with a time offset between the set of PUSCH resources and the fourth set of resources, wherein the at least one MAC-CE that triggers the aperiodic CSI reporting indicates the set of PUSCH resources and the time offset between the set of PUSCH resources and the fourth set of resources.

12. The UE of claim 1, wherein, to output the aperiodic CSI report, the processing system is further configured to:

output the aperiodic CSI report via a set of physical uplink shared channel (PUSCH) resources in accordance with a time offset between the set of PUSCH resources and the second set of resources, wherein the at least one MAC-CE that triggers the aperiodic CSI reporting indicates the set of PUSCH resources and the time offset between the set of PUSCH resources and the second set of resources.

13. The UE of claim 1, wherein, to obtain the one or more aperiodic reference signals via the second set of resources, the processing system is further configured to measure channel state information (CSI) via at least one aperiodic channel measurement resource (CMR) or interference measurement resource (IMR) associated with the second cell.

14. The UE of claim 1, wherein the processing system is further configured to obtain downlink scheduling information associated with the second cell in accordance with the aperiodic CSI report from the apparatus; and obtain, via the second cell, at least one downlink message in accordance with the downlink scheduling information.

15. The UE of claim 1, wherein, to output the aperiodic CSI report, the processing system is further configured to:

output the aperiodic CSI report via a set of physical uplink shared channel (PUSCH) resources associated with at least one of the first cell, the second cell, or a third cell that is activated for the apparatus.

16. A network entity for wireless communication, comprising:

a processing system that includes one or more processors and one or more code-storing memories coupled with the one or more processors, the processing system configured to cause the network entity to:

output, via a first set of resources associated with a first cell, at least one medium access control (MAC)-control element (CE) that activates a second cell and triggers aperiodic channel state information (CSI) reporting for the second cell;

output, in accordance with the at least one MAC-CE, one or more aperiodic reference signals via a second set of resources associated with the second cell; and obtain an aperiodic CSI report associated with a measurement of the one or more aperiodic reference signals.

17. The network entity of claim 16, wherein, to output the at least one MAC-CE, the processing system is further configured to:

output, via the at least one MAC-CE in accordance with the at least one MAC-CE activating the second cell, a first indication to trigger aperiodic tracking reference signal (TRS) measurements for the second cell and a second indication to trigger the aperiodic CSI reporting for the second cell, wherein the at least one MAC-CE is a single MAC-CE, and wherein outputting the one or more aperiodic reference signals via the second set of resources is in accordance with the second indication.

18. The network entity of claim 16, wherein, to output the at least one MAC-CE, the processing system is further configured to:
output a first MAC-CE that activates the second cell and triggers aperiodic tracking reference signal (TRS) measurements for the second cell; and
output a second MAC-CE that triggers the aperiodic CSI reporting for the second cell, wherein outputting the one or more aperiodic reference signals is in accordance with the second MAC-CE.

19. The network entity of claim 16, wherein the processing system is further further configured to:
output an indication of a plurality of aperiodic channel measurement resources (CMRs) and a plurality of aperiodic interference measurement resources (IMRs) associated with the second cell via control signaling, wherein the plurality of aperiodic CMRs and the plurality of aperiodic IMRs comprise the second set of resources.

20. The network entity of claim 19, wherein the indication of the plurality of aperiodic CMRs and the plurality of aperiodic IMRs indicates that the plurality of aperiodic CMRs and the plurality of aperiodic IMRs are exclusively associated with the aperiodic CSI reporting triggered by the at least one MAC-CE that activates the second cell.

21. The network entity of claim 19, wherein:
the at least one MAC-CE indicates the second set of resources from the plurality of aperiodic CMRs and the plurality of aperiodic IMRs, and
the second set of resources comprises an aperiodic CMR from the plurality of aperiodic CMRs and an aperiodic IMR from the plurality of aperiodic IMRs.

22. A method for wireless communication at a user equipment (UE), comprising:
receiving, via a first set of resources associated with a first cell, at least one medium access control (MAC)-control element (CE) that activates a second cell and triggers aperiodic channel state information (CSI) reporting for the second cell;
receiving, in accordance with the at least one MAC-CE, one or more aperiodic reference signals via a second set of resources associated with the second cell; and
transmitting an aperiodic CSI report associated with a measurement of the one or more aperiodic reference signals.

23. The method of claim 22, wherein receiving the at least one MAC-CE comprises:
receiving, via the at least one MAC-CE in accordance with the at least one MAC-CE activating the second cell, a first indication to trigger aperiodic tracking reference signal (TRS) measurements for the second cell and a second indication to trigger the aperiodic CSI reporting for the second cell, wherein the at least one MAC-CE is a single MAC-CE, and wherein receiving the one or more aperiodic reference signals via the second set of resources is in accordance with the second indication.

24. The method of claim 22, wherein receiving the at least one MAC-CE comprises:

receiving a first MAC-CE that activates the second cell and triggers aperiodic tracking reference signal (TRS) measurements for the second cell; and
receiving a second MAC-CE that triggers the aperiodic CSI reporting for the second cell, wherein receiving the one or more aperiodic reference signals is in accordance with the second MAC-CE.

25. The method of claim 22, further comprising:
receiving at least one aperiodic tracking reference signal (TRS) via a third set of resources associated with the second cell, wherein the at least one MAC-CE further triggers the at least one aperiodic TRS, and wherein the at least one MAC-CE that triggers the aperiodic CSI reporting indicates a time offset between the third set of resources and the second set of resources.

26. A method for wireless communication at a network entity, comprising:
transmitting, via a first set of resources associated with a first cell, at least one medium access control (MAC)-control element (CE) that activates a second cell and triggers aperiodic channel state information (CSI) reporting for the second cell;
transmitting, in accordance with the at least one MAC-CE, one or more aperiodic reference signals via a second set of resources associated with the second cell; and
receiving an aperiodic CSI report associated with a measurement of the one or more aperiodic reference signals.

27. The method of claim 26, further comprising:
transmitting at least one aperiodic tracking reference signal (TRS) via a third set of resources associated with the second cell, wherein the at least one MAC-CE further triggers the at least one aperiodic TRS, and wherein the at least one MAC-CE that triggers the aperiodic CSI reporting indicates a time offset between the third set of resources and the second set of resources.

28. The method of claim 27, further comprising:
receiving a message that indicates a quantity of slots associated with the time offset between the third set of resources and the second set of resources, wherein the quantity of slots is associated with a threshold duration of the time offset between the third set of resources and the second set of resources and is associated with a capability of a user equipment (UE) to acquire downlink synchronization using the at least one aperiodic TRS, and wherein the second set of resources are scheduled according to a downlink resource availability of the network entity.

29. The method of claim 26, further comprising:
receiving hybrid automatic repeat request (HARQ)-acknowledgement (ACK) feedback for the at least one MAC-CE via a fourth set of resources associated with the first cell.

30. The method of claim 29, wherein receiving the aperiodic CSI report comprises:
receiving the aperiodic CSI report via a set of physical uplink shared channel (PUSCH) resources in accordance with a time offset between the set of PUSCH resources and the fourth set of resources, wherein the at least one MAC-CE that triggers the aperiodic CSI reporting indicates the set of PUSCH resources and the time offset between the set of PUSCH resources and the fourth set of resources.

31. The method of claim 26, further comprising:
transmitting, via the at least one MAC-CE in accordance with the at least one MAC-CE activating the second cell, a first indication to trigger aperiodic tracking reference signal (TRS) measurements for the second cell and a second indication to trigger the aperiodic CSI reporting for the second cell, wherein the at least one MAC-CE is a single MAC-CE, and wherein transmitting the one or more aperiodic reference signals via the second set of resources is in accordance with the second indication.

32. The method of claim 26, further comprising:
transmitting a first MAC-CE that activates the second cell and triggers aperiodic tracking reference signal (TRS) measurements for the second cell; and
transmitting a second MAC-CE that triggers the aperiodic CSI reporting for the second cell, wherein transmitting the one or more aperiodic reference signals is in accordance with the second MAC-CE.

* * * * *